(12) United States Patent
Zhang et al.

(10) Patent No.: US 10,334,621 B2
(45) Date of Patent: Jun. 25, 2019

(54) BUFFER STATUS REPORT

(71) Applicant: Telefonaktiebolaget LM Ericsson (publ), Stockholm (SE)

(72) Inventors: Hanzhi Zhang, München (DE); Torsten Dudda, Aachen (DE); Per Synnergren, Gammelstad (SE); Stefan Wager, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 85 days.

(21) Appl. No.: 15/507,897

(22) PCT Filed: Sep. 1, 2014

(86) PCT No.: PCT/EP2014/068511
§ 371 (c)(1),
(2) Date: Mar. 1, 2017

(87) PCT Pub. No.: WO2016/034195
PCT Pub. Date: Mar. 10, 2016

(65) Prior Publication Data
US 2018/0227941 A1 Aug. 9, 2018

(51) Int. Cl.
*H04W 72/12* (2009.01)
*H04W 24/10* (2009.01)
(Continued)

(52) U.S. Cl.
CPC ....... *H04W 72/1284* (2013.01); *H04W 24/10* (2013.01); *H04W 28/0278* (2013.01); *H04W 56/0065* (2013.01); *H04W 72/0413* (2013.01)

(58) Field of Classification Search
CPC ......... H04W 72/1284; H04W 72/0413; H04W 28/0278; H04W 24/10; H04W 56/0065
See application file for complete search history.

(56) References Cited

U.S. PATENT DOCUMENTS

| 8,391,190 B2 | 3/2013 | Pan et al. |
| 2010/0284314 A1 | 11/2010 | Pelletier et al. |

(Continued)

FOREIGN PATENT DOCUMENTS

| EP | 2190225 A1 | 5/2010 |
| EP | 2388958 A1 | 11/2011 |

(Continued)

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.2.1, Jun. 2014, 1-57.

(Continued)

*Primary Examiner* — Walli Z Butt
(74) *Attorney, Agent, or Firm* — Murphy, Bilak & Homiller, PLLC

(57) ABSTRACT

Depending on data (110) available in an uplink data buffer (400) of a communication device (10) for uplink transmission and further depending on uplink radio resources previously allocated to the communication device (10) for the uplink transmission in reoccurring time intervals, a fraction (111-1) of the data (110) available in the uplink data buffer (400) is determined. A buffer status report is sent to the cellular network. The buffer status report indicates the determined fraction (111-1) of the data (110).

29 Claims, 13 Drawing Sheets

(51) Int. Cl.
*H04W 28/02* (2009.01)
*H04W 56/00* (2009.01)
*H04W 72/04* (2009.01)

(56) References Cited

U.S. PATENT DOCUMENTS

| | | | |
|---|---|---|---|
| 2011/0205975 A1* | 8/2011 | Umesh | H04W 72/1284 370/329 |
| 2011/0268087 A1 | 11/2011 | Kwon et al. | |
| 2012/0069805 A1* | 3/2012 | Feuersanger | H04W 72/1284 370/329 |
| 2013/0301579 A1* | 11/2013 | Zhang | H04W 72/1252 370/329 |
| 2014/0133447 A1 | 5/2014 | Moulsley et al. | |
| 2015/0215945 A1* | 7/2015 | Hsu | H04L 47/21 370/254 |

FOREIGN PATENT DOCUMENTS

| | | |
|---|---|---|
| EP | 2434790 A1 | 3/2012 |
| EP | 2675081 A1 | 12/2013 |
| WO | 2012024040 A1 | 2/2012 |
| WO | 2013169173 A1 | 11/2013 |
| WO | 2014051478 A1 | 4/2014 |
| WO | 2016034193 A1 | 3/2016 |

OTHER PUBLICATIONS

3GPP, "3rd Generation Partnership Project; Technical Specification Group Radio Access Network; Evolved Universal Terrestrial Radio Access (E-UTRA); Physical layer procedures (Release 12)", 3GPP TS 36.213 V12.2.0, Jun. 2014, 1-207.

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.2.0, Jun. 2014, 1-365.

Unknown, Author, "HTTP Archive—Trends", http://httparchive.org/trends.php, URLs Analyzed, Jul. 22, 2014, 1-6.

Unknown, Author, "UE Buffer Status Reporting in E-UTRAN", 3GPP TSG-RAN WG2 meeting #59bis, R2-074204, Ericsson, Shanghai, China, Oct. 8-12, 2007, 1-3.

* cited by examiner

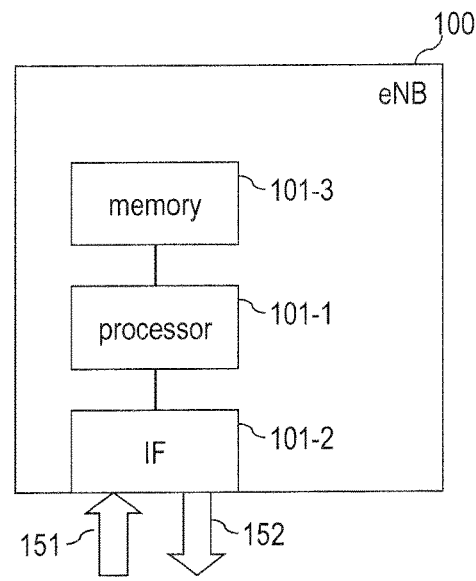
FIG. 8
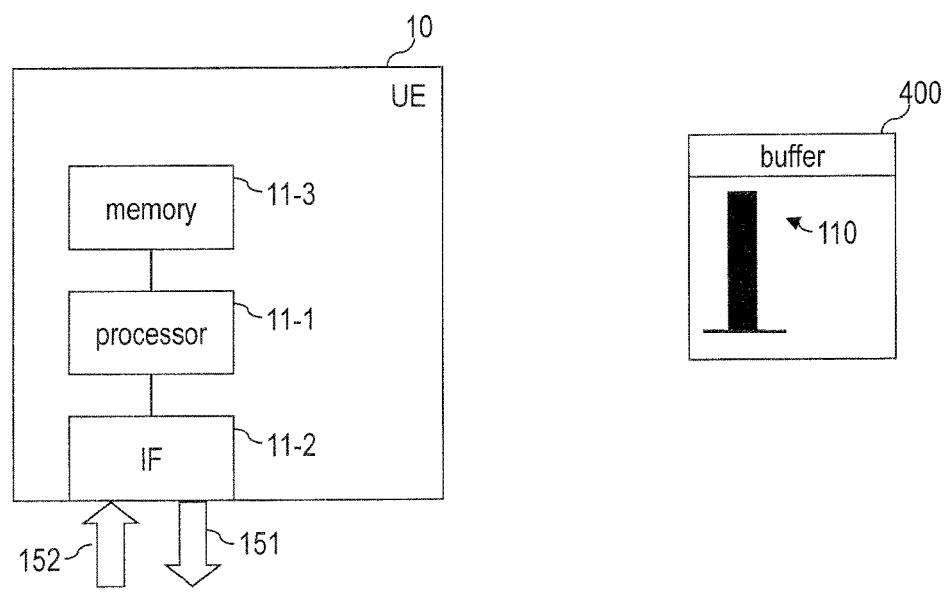
FIG. 9
FIG. 10

BUFFER STATUS REPORT

TECHNICAL FIELD

Various embodiments relate to a method of controlling sending of a buffer status report and to a communication device configured to control sending of a buffer status report. Further embodiments relate to a method of controlling allocation of further uplink radio resources and to a network node configured to control allocation of further uplink radio resources. In particular, various embodiments relate to techniques of handling a buffer status report.

BACKGROUND

Techniques of indicating data available in an uplink data buffer of a communication device (UE) to a cellular network are known. E.g., from the Third Generation Partnership Project (3GPP) Technical Specification (TS) 36.321, version 12.2.1 of Jun. 10, 2014, it is known to send a buffer status report (BSR) including the buffer size field which identifies the total amount of data available in the uplink data buffer of the UE. The indication of the data available in the uplink data buffer may be employed by a network node of the cellular network to allocate further uplink radio resources to the UE. The UE can then perform uplink transmission of the data in the uplink data buffer by employing the further uplink radio resources.

However, such techniques face certain restrictions. In particular, scenarios are known where—prior to the sending of the BSR—uplink radio resources had been previously allocated to the UE for uplink transmission in reoccurring time intervals. The UE may employ these previously allocated uplink radio resources for the uplink transmission of at least parts of the data in the uplink data buffer. Then a mismatch between the further radio resources allocated to the UE based on the BSR and the actually required radio resources may occur. This may lead to inefficiencies when allocating the further uplink radio resources on the uplink data channel.

SUMMARY

Therefore, a need exists to provide techniques of handling a BSR which alleviate at least some of the above-mentioned restrictions. In particular, a need exists for such techniques which allow to more accurately allocate the further uplink radio resources to the UE depending on the actual need.

This need is met by the features of the independent claims. The dependent claims define embodiments.

According to an aspect, a method of controlling sending of a BSR from a UE to a cellular network is provided. The method comprises, depending on data available in an uplink data buffer of the UE for uplink transmission and further depending on uplink radio resources previously allocated to the UE for the uplink transmission in reoccurring time intervals, determining a fraction of the data available in the uplink data buffer. The method further comprises the UE sending the BSR to the cellular network. The BSR indicates the determined fraction of the data.

According to a further aspect, a UE configured to control sending of a BSR from the UE to the cellular network is provided. The UE comprises at least one processor which is configured to, depending on data available in an uplink data buffer of the UE for uplink transmission and further depending on uplink radio resources previously allocated to the communication device for the uplink transmission in reoccurring time intervals, determine a fraction of the data available in the uplink data buffer. The UE further comprises an interface for communication with the cellular network. The at least one processor is further configured to send the BSR via the interface to the cellular network. The BSR indicates the determined fraction of the data.

According to a further aspect, a method of controlling allocation of further uplink radio resources for an uplink transmission from a UE to a cellular network is provided. The method comprises receiving a BSR from a UE. The BSR indicates data available in an uplink data buffer of the UE for the uplink transmission. The method further comprises, depending on the data and further depending on uplink radio resources previously allocated to the UE for the uplink transmission in reoccurring time intervals, determining a fraction of data. The method further comprises, depending on the determined fraction of the data, selectively allocating, to the UE, the further uplink radio resources for the uplink transmission of at least parts of the determined fraction of the data.

According to a further aspect, a network node for a cellular network is provided. The network node is configured to control allocation of further uplink radio resources for an uplink transmission from a UE to the cellular network. The network node comprises an interface for communication with the UE. The network node further comprises at least one processor. The at least one processor is configured to receive, via the interface, a BSR from the UE. The BSR indicates data available in an uplink data buffer of the UE for the uplink transmission. The at least one processor is configured to determine a fraction of the data depending on the data and further depending on uplink radio resources previously allocated to the UE for the uplink transmission in reoccurring time intervals. The at least one processor is configured to selectively allocate the further uplink radio resources to the UE for the uplink transmission of at least parts of the determined fraction of the data depending of the determined fraction of the data.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF DRAWINGS

The foregoing and additional features and effects of the invention will become apparent from the following detailed description when read in conjunction with the accompanying drawings, in which like reference numerals refer to like elements.

FIG. 8 schematically illustrates a base station for a cellular network according to an embodiment of the invention.

FIG. 9 schematically illustrates a UE according to an embodiment of the invention.

FIG. 10 is a schematic representation of an uplink data buffer of the UE according to an embodiment of the invention, wherein data scheduled for uplink transmission to the cellular network is available in the uplink data buffer.

DETAILED DESCRIPTION

Figure 1:
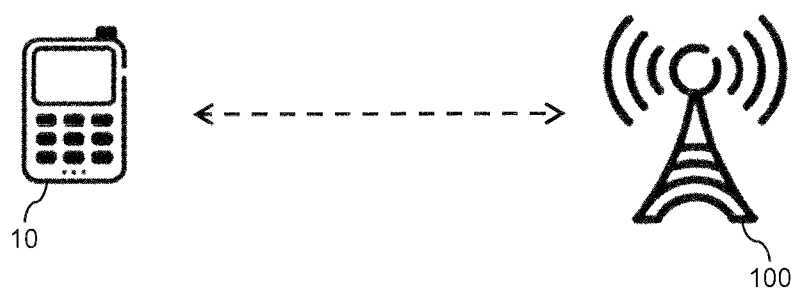
FIG. 1 schematically illustrates an exemplary cellular network environment with elements which may be involved in controlling uplink transmissions according to an embodiment of the invention.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques are described which relate to determining an effective amount of data for which allocation of further radio resources to a UE is prompted. The effective amount of data may be indicated in a BSR which is sent from the UE to a cellular network.

The embodiments specifically refer to a scenario using LTE radio access technology. However, it should be understood that the concepts could also be applied in connection with other radio access technologies, e.g., Universal Mobile Telecommunications System (UMTS) radio access technology.

There may be radio resources previously allocated to the UE for the uplink transmission in reoccurring time intervals. Once data becomes available in an uplink data buffer of the UE, uplink transmission of the data may quickly commence employing these previously allocated uplink radio resources. However, it is possible that the amount of data which may be transmitted employing the previously allocated uplink radio resources is comparably limited. In particular in such a scenario, allocation of the further uplink radio resources allows to transmit larger amounts of data. For this, a dynamic uplink grant may be transmitted from the cellular network to the UE, the dynamic uplink grant indicating the further uplink radio resources.

E.g., it is possible that the further radio resources are allocated so as to enable uplink transmission of a fraction of the data in the uplink buffer. For the fraction of the data, the uplink transmission might not possible within a certain time period when employing the previously allocated uplink radio resources. In other words, uplink transmission of a further fraction of the data may be possible within the time period when employing the previously allocated uplink radio resources; the fraction and the further fraction may be complementary to each other.

According to the illustrated concepts, uplink transmissions from a UE to the cellular network are performed on uplink radio resources which may be allocated by two types of uplink grants: first uplink grants, in the following referred to as IUA uplink grant (IUA: Instant Uplink Access), which each indicate radio resources allocated to the UE in reoccurring time intervals, and second uplink grants, in the following referred to as dynamic uplink grant (D-uplink grant), which each indicate uplink radio resources allocated to the UE in a certain time interval. The radio transmissions may be organized in radio frames each formed of a sequence of subframes, and the afore-mentioned time intervals may correspond to the individual subframes. For example, in the LTE radio access technology the time intervals may correspond to subframes of 1 ms duration. The IUA uplink grant may be prospectively provided to the UE in preparation of a future uplink transmission by the UE, without any indication of a specific need to transmit data by the UE. As compared to that, the D-uplink grants are provided to the UE in a dynamic manner, in particular on an as-needed basis. For example, a D-uplink grant may be sent in response to a scheduling request by the UE or in response to a BSR from the UE. The IUA-UL grant and the D-UL grants may be sent on a DL control channel, such as a Physical DL Control Channel (PDCCH) of the LTE radio access technology. By means of the IUA grants, a low latency associated with an uplink transmission by the UE may be provided. Specifically, on the uplink radio resources indicated by the IUA-uplink grant, the UE may perform the uplink transmission without previously indicating to the cellular network that there is a need to transmit data, e.g., by sending a scheduling request. Rather, the data can be transmitted in the next one of the reoccurring time intervals.

In the illustrated concepts, the allocated uplink radio resources indicated by the IUA-uplink grant are assumed to be utilized in a conditional manner. Specifically, for each of the time intervals the UE selects between an active mode and an inactive mode. In the active mode, the UE performs an uplink transmission on the allocated uplink radio resources indicated by the IUA-uplink grant. Conditions triggering the selection of the active mode may be a need to send data by the UE and/or a need to send a BSR by the UE and/or receiving a D-uplink grant. In the inactive mode, the UE performs no uplink transmission on the previously allocated uplink radio resources indicated by the IUA-uplink grant. The cellular network expects this behaviour of the UE and correspondingly selects between the active mode and the inactive mode. Specifically, the cellular network may detect that the UE performed an uplink transmission on the uplink radio resources indicated by the IUA-uplink grant and select the active mode to receive the uplink transmission. If the uplink transmission is received successfully, the cellular network may acknowledge this by sending a positive acknowledgement (ACK) to the UE. If the uplink transmission not received successfully, the cellular network may notify this by sending a negative acknowledgement (NACK) to the UE. E.g., sending of such ACKs or NACKs may be performed on the basis of a HARQ (Hybrid Automatic Repeat Request) protocol, e.g., as defined for the LTE radio access technology. Further, the cellular network may detect that the UE performed an uplink transmission on the uplink radio resources indicated by the IUA-uplink grant and may select the inactive mode. In the latter case, the cellular network may refrain from attempting to receive any uplink transmission on the uplink radio resources indicated by the IUA-uplink grant or taking any further action concerning such uplink transmission, e.g., sending acknowledgements.

By the conditional utilization of the previously allocated uplink radio resources indicated by the IUA-uplink grant, it can be avoided that the UE needs to perform an uplink transmission in each time interval, which allows for energy efficient operation of the UE and may also avoid unnecessary interference due to the uplink transmissions on the uplink radio resources indicated by the IUA-uplink grant.

FIG. 1 illustrates exemplary elements which may be involved in implementing a corresponding control of an uplink scheduling process. FIG. 1 illustrates a UE 10. The UE 10 may correspond to a mobile phone, a smartphone, a computer with wireless connectivity, or the like. As an example of a network node of the cellular network which is responsible for controlling radio transmission by the UE 10, FIG. 1 illustrates a base station 100. It is noted that, for brevity of description, the network node 100 may be also referred to as node in the following. In accordance with the assumed utilization of the LTE radio access technology, the base station 100 is embodied as eNodeB and will in the following also be referred to as eNB. The eNB 100 is assumed to be responsible for performing the scheduling of uplink transmissions, in particular providing the IUA-uplink grants and providing the D-uplink grants.

It is to be understood that also other nodes may be involved in controlling at least a part of the uplink scheduling process. For example, when utilizing the UMTS radio access technology, a network node referred to as RNC (Radio Network Controller) could implement similar functionalities as explained for the eNB 100 and/or could be realised by a similar hardware structure, as explained for the eNB 100 with reference to FIG. 8.

Figure 2:
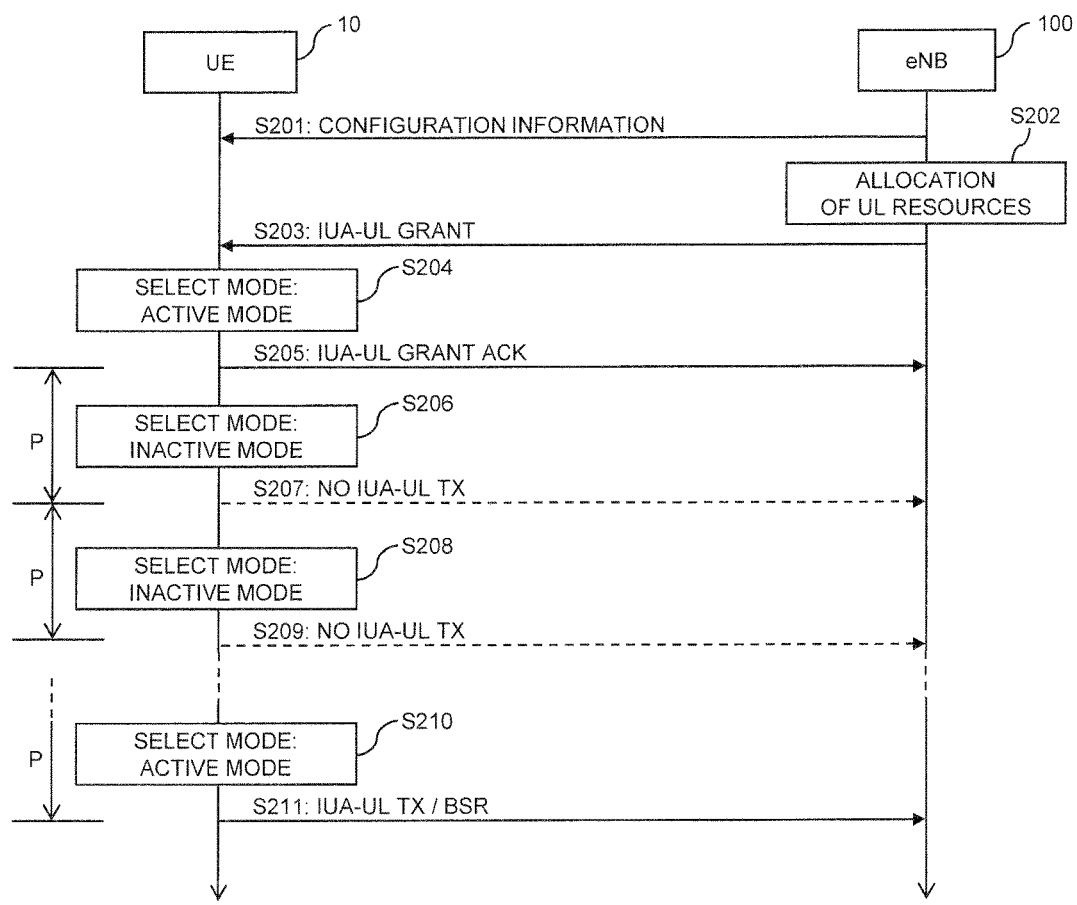
FIG. 2 schematically illustrates an exemplary process for performing uplink radio transmissions according to an embodiment of the invention.

FIG. 2 shows an exemplary processes of performing uplink transmissions on the basis of the IUA-uplink grant. The processes of FIG. 2 involve the UE 10 and the eNB 100.

At step S201, the eNB 100 may send configuration information to the UE 10. The configuration information may for example indicate radio resources of an uplink control channel which are allocated to the UE 10, e.g., radio resources of a Physical Uplink Control Channel (PUCCH). Further, the configuration information could also provide various other kinds of information for establishing connectivity between the UE 10 and the eNB 100. The configuration information may also indicate a configuration to be utilized by the UE 10 for various kinds of reporting to the cellular network, e.g., reporting of Channel State Information (CSI) or conditions for triggering a BSR. The configuration information may for example be sent in an RRC (Radio Resource Control) message or by some other form of control signaling, e.g., in a MIB (Master Information Block) or SIB (System Information Block).

At step S202, the eNB 100 may allocate uplink radio resources to the UE 10. Specifically, the eNB 100 allocates these uplink radio resources in periodically reoccurring time intervals to the UE 10, e.g., in each subframe or in some other predefined sequence of subframes, such as in every second subframe, every third subframe, every fourth subframe, or the like. In general, it is not necessary that the uplink radio resources are allocated to the UE for time intervals that are arranged periodically. These uplink radio resources may be radio resources of an uplink data channel, such as the Physical uplink Shared Channel (PUSCH) in case of the 3GPP LTE radio access technology. The uplink data channel may be used to execute uplink transmission for payload or uplink data and control data; an uplink control channel—such as the PUCCH in case of the 3GPP LTE radio access technology—may be employed for the transmission of control data.

The eNB 100 then sends an IUA-uplink grant S203 to the UE 10. The IUA-uplink grant of step S203 indicates the previously allocated uplink radio resources of step S202. The IUA-UL grant of step S203 may be sent on the PDCCH. For example, the previously allocated uplink radio resources may be indicated in terms of one or more resource blocks (RBs). Further, the IUA-uplink grant may also indicate a periodicity in which the previously allocated uplink radio resources reoccur. Alternatively, such periodicity could also be indicated by separate control information, e.g., the control information of step S201. In FIG. 2, the periodicity in which the previously allocated uplink radio resources reoccur is indicated by P corresponding to a time offset between two time intervals with uplink radio resources previously allocated by the IUA-uplink grant. In the following this time interval is also referred to as IUA period.

The IUA-uplink grant may be provided with an indicator which allows the UE 10 to distinguish the IUA-uplink grant from other types of grants, e.g., a D-uplink grant. Such indicator may for example be included in an information field of the IUA-uplink grant. Further, the indicator could also be provided by utilizing a specific identifier to address the IUA-uplink grant to the UE 10, e.g., a specific C-RNTI (Cell Radio Network Temporary Identity). For example, a one C-RNTI could be provided for addressing IUA-uplink grants to the UE 10, and one or more other C-RNTIs could be provided for addressing other types of IUA-uplink grants to the UE 10, such as D-uplink grants.

After receiving the IUA-uplink grant in step S203, the UE 10 may enter the IUA operation, in which the previously allocated uplink radio resources indicated by the IUA uplink grant may be instantly utilized for performing low latency uplink transmissions. In the IUA operating mode, the UE 10 checks for each of the time intervals with the previously allocated uplink radio resources whether a condition for selecting the active mode is met. If this is the case, the UE 10 selects the active mode and performs an uplink transmission on the previously allocated uplink radio resources. If this is not the case, the UE 10 selects the inactive mode and performs no transmission on the previously allocated uplink radio resources.

As illustrated by step S204, in the first time interval with the previously allocated uplink resources indicated by the IUA-uplink grant of step S203, the UE 10 may select the active mode to perform an uplink transmission on the previously allocated resources which includes an acknowledgement (IUA-uplink grant ACK) in step S205 of receipt of the IUA-uplink grant by the UE 10. The IUA-uplink grant acknowledgement of step S205 may confirm to the eNB 100 that the UE 10 entered the IUA operating mode, which for example means that the eNB 100 should expect an uplink transmission on the previously allocated uplink radio resources indicated by the IUA-uplink grant of step S203. The IUA-uplink grant acknowledgement of step S205 may for example correspond to a IUA-uplink TX with data padding, i.e., without actual meaningful data but a predefined or random data pattern, such as only zeros.

As further illustrated by steps S206 and S208, in some time intervals with previously allocated uplink radio resources indicated by the IUA-uplink grant of step S203, the UE 10 may select the inactive mode. In this case, the UE 10 performs no uplink transmission on the previously allocated uplink radio resources indicated by the IUA-uplink grant (no IUA-uplink TX), as indicated by the dashed arrows of steps S207 and S209.

As further illustrated by step S210, in some time intervals with previously allocated uplink radio resources indicated by the IUA-uplink grant of step S203, the UE 10 may select the active mode to perform in a step S211 an uplink transmission on the previously allocated uplink radio resources indicated by the IUA-uplink grant (IUA-uplink TX). Selecting the active mode at step 210 may for example be triggered by a need for transmission of data in a transmission buffer of the UE 10. In such case, the IUA-uplink TX 211 may include at least a part of this data and a BSR. Selecting the active mode at step S210 could also be triggered by a need to send a BSR by the UE 10, without a need for transmission of data. In such case, the IUA-uplink TX 211 may include the BSR, but no data.

Figure 3:
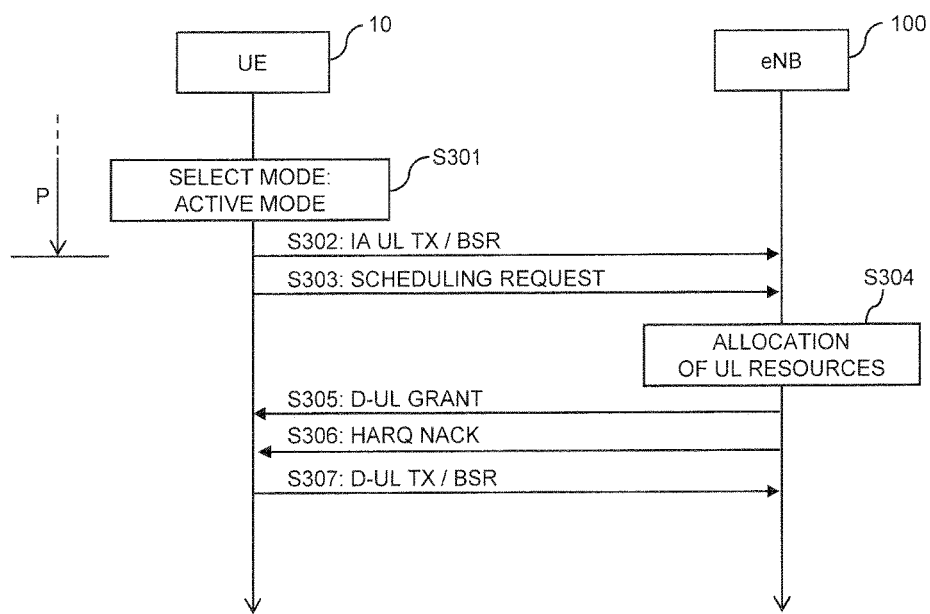
FIG. 3 schematically illustrates a further exemplary process for performing uplink radio transmissions according to an embodiment of the invention.

FIG. 3 shows further exemplary processes of performing uplink transmissions on the basis of the IUA-uplink grant. Also the processes of FIG. 3 involve the UE 10 and the eNB 100. The processes of FIG. 3 may, e.g., be performed in the IUA operating mode of the UE 10, after receiving the IUA-uplink grant.

As indicated by step S301, in a certain time interval with previously allocated uplink radio resources indicated by the IUA-uplink grant, the UE 10 may select the active mode to perform an uplink transmission of data on the previously allocated uplink radio resources indicated by the IUA-uplink grant, in FIG. 3 illustrated by IUA-uplink TX in step S302 (which may also include a BSR).

In addition to sending the IUA-uplink TX of step S302, the UE 10 may also send a scheduling request in step S303 to the eNB 100.

As indicated by step S304, in response to the scheduling request, the eNB 100 performs allocation of further uplink radio resources to the UE 10, step S304. The eNB 100 sends a D-uplink grant to the UE 10 in step S305 which indicates these further uplink radio resources.

In the processes of FIG. 3, it is further assumed that the IUA-uplink TX of step S302 could not be successfully received by the eNB 100, e.g., due to poor link adaptation between the UE 10 and the eNB 100. Accordingly, the eNB 100 notifies the UE 10 of the failed reception by sending a HARQ NACK, step S306.

The HARQ NACK of step S306 causes the UE 10 to retransmit the data on the further uplink radio resources indicated by the D-uplink grant of step S305, as indicated by dynamic uplink transmission (D-uplink TX) in step S307. Similar to IUA-uplink TX 302, also the D-uplink transmission in step S307 may include a BSR.

In the processes of FIG. 3, sending the scheduling request in step S305 together with the initial IUA-uplink TX of step S302 allows for avoiding additional delays if the IUA-uplink TX fails, i.e., for achieving a similar performance with respect to latency as in the case of utilizing only scheduling request based dynamic scheduling.

Figure 4:
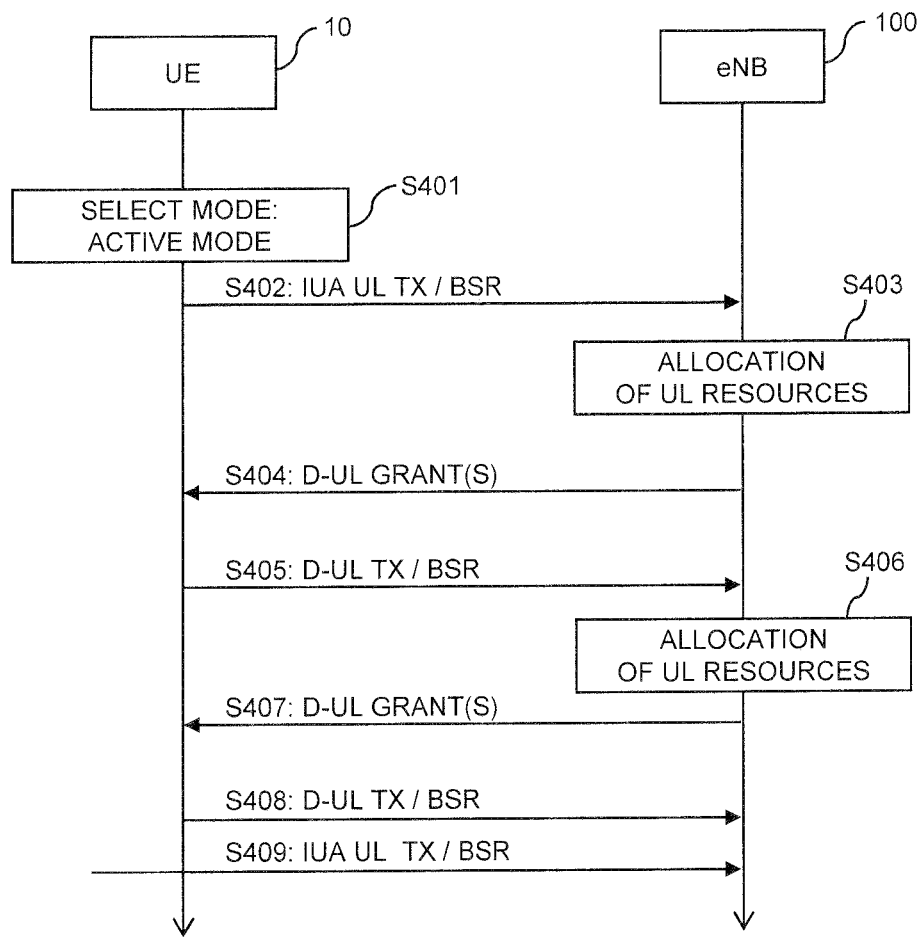
FIG. 4 schematically illustrates a further exemplary process for performing uplink radio transmissions according to an embodiment of the invention.

FIG. 4 shows further exemplary processes of performing uplink transmissions on the basis of the IUA-uplink grant. Also the processes of FIG. 4 involve the UE 10 and the eNB 100. The processes of FIG. 4 may for example be performed in the IUA operating mode of the UE 10, after receiving the IUA-uplink grant.

As indicated by step S401, in a certain time interval with previously allocated uplink radio resources indicated by the IUA-uplink grant, the UE 10 may select the active mode to perform an uplink transmission of data on the previously allocated uplink radio resources indicated by the IUA-uplink grant, which is illustrated in FIG. 4 by the IUA-uplink TX in step S402. As illustrated, the IUA-uplink TX of step S402 also includes a BSR. The BSR indicates an amount of further data pending for transmission by the UE 10.

As indicated by step S403, on the basis of the BSR in IUA-uplink TX of step S402, the eNB 100 performs allocation of further uplink radio resources to the UE 10. The eNB 100 sends a D-uplink grant in a step S404 to the UE 10 which indicates these further uplink radio resources.

The UE 10 may then transmit at least a part of the further data on the further uplink radio resources indicated by the D-uplink grant of step S404, as indicated by D-uplink transmission, step S405. Also D-uplink transmission of step S405 includes a BSR which indicates an amount of further data pending for uplink transmission by the UE 10.

As indicated by step S406, on the basis of the BSR in D-uplink TX of step S405 the eNB 100 performs allocation of the further uplink radio resources to the UE 10. The eNB 100 sends a further D-uplink grant in step S407 to the UE 10 which indicates these further uplink radio resources.

The UE 10 may then transmit at least a part of the further data in the uplink transmission buffer of the UE 10 on the further uplink radio resources indicated by the D-uplink grant of step S407, as indicated by D-uplink transmission in step S408. Again, D-uplink transmission of step S408 includes a BSR which indicates an amount of further data pending for transmission by the UE 10.

As further illustrated, the UE 10 may also perform a further IUA-uplink TX in step S409 at a later time interval with the previously allocated uplink radio resources indicated by the IUA-uplink grant. Again, IUA-uplink TX of step S409 includes a BSR which indicates an amount of further data pending for transmission by the UE 10.

As can be seen from the processes of FIG. 4, the BSR in a IUA-uplink TX may trigger allocation of further uplink radio resources which may then be indicated in a D-uplink grant. These further uplink radio resources may then be used alternatively or in addition to the previously allocated uplink radio resources indicated by the IUA-uplink grant for transmission of data. In this way, the amount of uplink radio resources allocated to the UE 10 may be dynamically adapted to the current uplink traffic demand of the UE 10, while at the same time allowing fast initial access to uplink radio resources.

Figure 5:
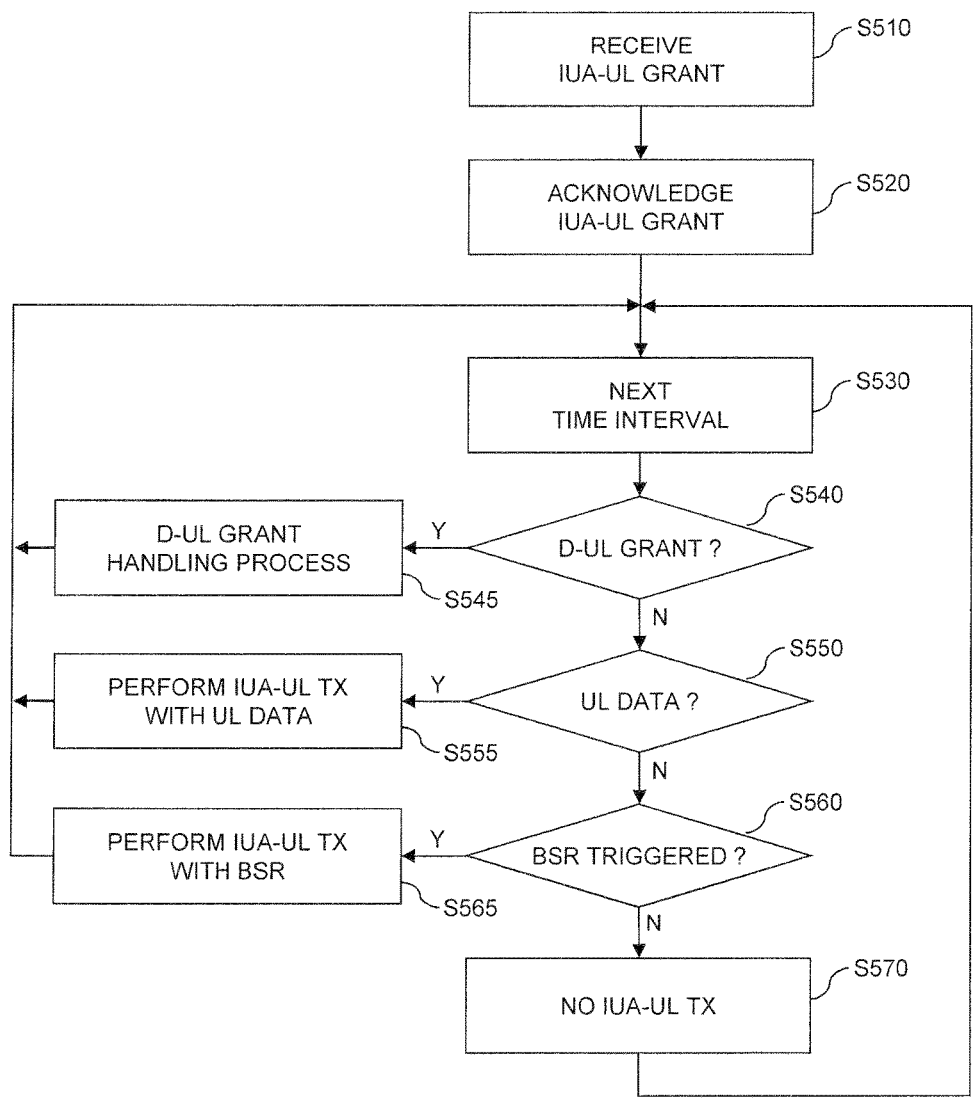
FIG. 5 shows a flowchart for illustrating a method according to an embodiment of the invention, which may be implemented by a UE.

FIG. 5 shows a flowchart for illustrating a method which may be utilized for controlling the UE 10 to operate in accordance with the above-mentioned concepts. If a processor based implementation of the UE 10 is used, the steps of the method may be performed by one or more processors of the UE 10. For this purpose, the processor(s) may execute correspondingly configured program code. Further, at least some of the corresponding functionalities may be hardwired in the processor(s).

At step S510, the UE 10 receives the IUA-uplink grant. The communication device may receive the IUA-UL grant on a DL control channel, e.g., on the PDCCH of the LTE radio access technology. The IUA-uplink grant indicates radio resources allocated to the UE 10 in reoccurring time intervals, e.g., corresponding to a periodic pattern of subframes.

As indicated by step S520, the UE 10 may then acknowledge receipt of the IUA-uplink grant, e.g., by performing a padded uplink transmission on the previously allocated uplink radio resources indicated in the IUA-uplink grant.

The UE 10 may then enter the IUA operation and perform the following actions when reaching a next time interval with previously allocated uplink radio resources indicated in the IUA-uplink grant, as indicated by step S530.

At step S540, the UE 10 may check whether a D-uplink grant was received by the UE 10. If this is the case, the utilization of the D-uplink grant may be prioritized over the utilization of the IUA-uplink grant, and the method may proceed with step S545, as indicated by branch At step S545, further uplink radio resources indicated by the D-uplink grant may be utilized for performing a D-uplink transmission. If no data is available in the uplink data buffer for the uplink transmission, the D-uplink transmission may include a BSR, but no data.

For the next time interval, the method may then return to step S530.

If at step S540 no D-uplink grant was received by the UE 10, the method may proceed with step 550, as indicated by branch "N".

At step S550, the UE 10 may check whether data need to be transmitted by the UE 10. If this is the case, the method may proceed with step S555, as indicated by branch "Y".

At step S555, the UE 10 selects the active mode and performs an IUA-uplink TX on the previously allocated uplink radio resources indicated in the IUA-uplink grant. This IUA-uplink TX includes at least a part of the data and may further include a BSR. For the next time interval, the method may then return to step S530.

If at step S550 there is no need for transmission of data, the method may proceed with step S560, as indicated by branch "N".

At step S560, the UE 10 may check whether a trigger condition for sending a BSR is fulfilled. If this is the case, the method may proceed with step S565, as indicated by branch "Y".

At step S565, the UE 10 selects the active mode and performs an IUA-uplink TX on the previously allocated uplink radio resources indicated in the IUA-uplink grant. This IUA-uplink TX includes a BSR, but no data. For the next time interval, the method may then return to step S530.

If at step S560 no trigger condition for sending a BSR is fulfilled, the method may proceed with step S570, as indicated by branch "N".

At step S570, the UE 10 selects the inactive mode and performs no IUA-uplink TX on the previously allocated uplink radio resources indicated in the IUA-uplink grant. For the next time interval, the method may then return to step S530.

Figure 6:
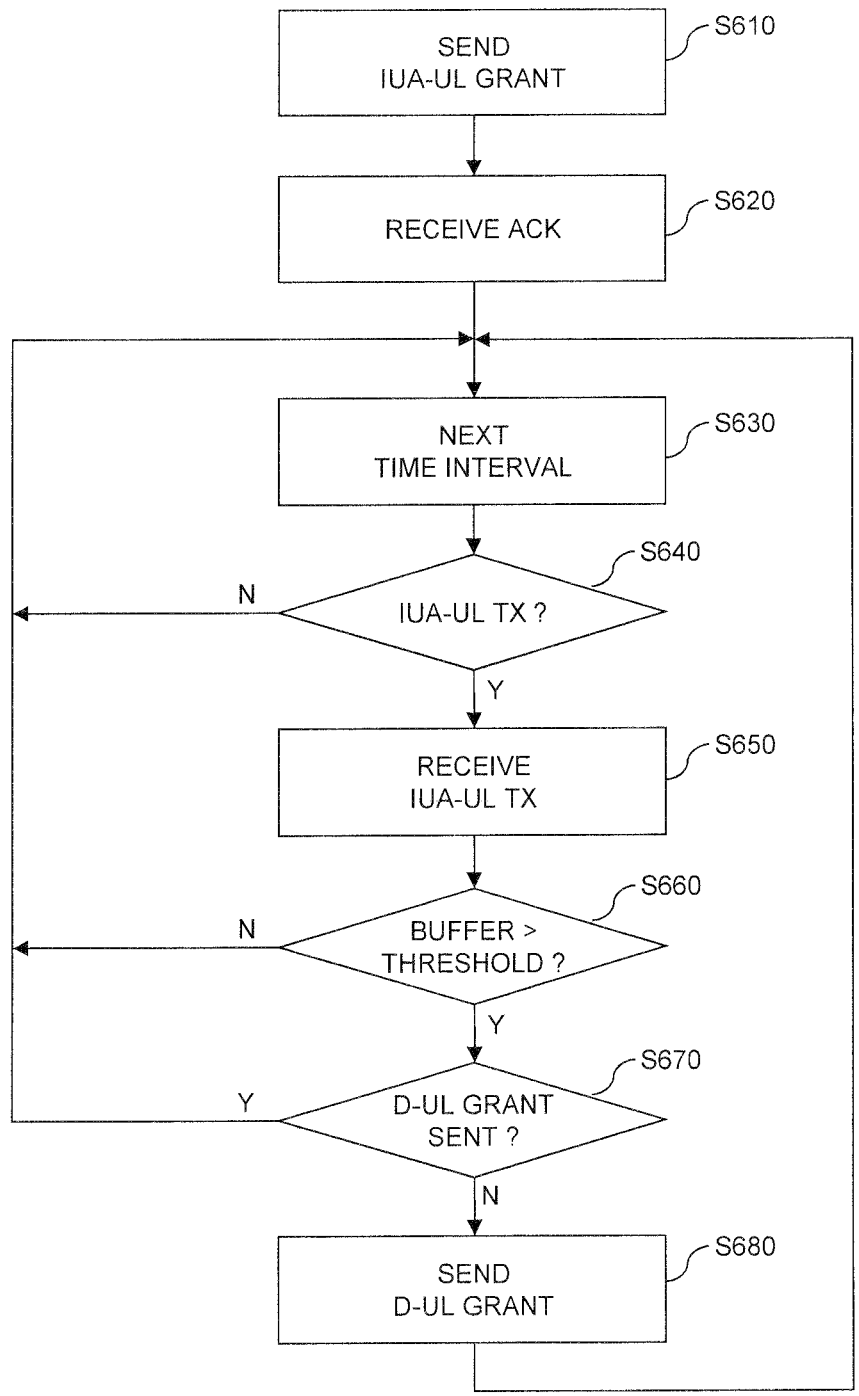
FIG. 6 shows a flowchart for illustrating a method according to an embodiment of the invention, which may be implemented by a network node.

FIG. 6 shows a flowchart for illustrating a method which may be implemented by a node of the cellular network, e.g., the eNB 100, to control a UE 10 in accordance with the above-mentioned concepts. If a processor based implementation of the node is used, the steps of the method may be performed by one or more processors of the node. For this purpose, the processor(s) may execute correspondingly configured program code. Further, at least some of the corresponding functionalities may be hardwired in the processor (s).

At step S610, the node sends the IUA-uplink grant to the UE 10. The node may send the IUA-UL grant on a DL control channel, e.g., on the PDCCH of the LTE radio access technology. The IUA-grant indicates radio resources allocated to the communication device in periodically reoccurring time intervals, e.g., corresponding to a periodic pattern of subframes.

As indicated by step S620, the node may then receive an acknowledgement of receipt of the IUA-uplink grant by the UE 10. For example, the acknowledgement may be indicated by a padded uplink transmission on the previously allocated uplink radio resources indicated in the IUA-uplink grant.

The node may then enter the IUA operation and perform the following actions when reaching a next time interval with previously allocated uplink radio resources indicated in the IUA-uplink grant, as indicated by step S630.

At step S640, the node may check whether the UE 10 performed an IUA-uplink TX on the previously allocated uplink radio resources indicated in the IUA-uplink grant. For this purpose, the node may for example detect a signal level on the previously allocated uplink radio resources. If the signal level is above a threshold, the node may determine that the UE 10 performed an IUA-uplink TX on the previously allocated uplink radio resources indicated in the IUA-uplink grant.

If at step S640 no IUA-uplink TX on the previously allocated uplink radio resources indicated in the IUA-uplink grant is detected, the method may return to step S630 for the next time interval, as indicated by branch "N".

If at step S640 an IUA-uplink TX on the previously allocated uplink radio resources indicated in the IUA-uplink grant is detected, the method may continue with step S650, as indicated by branch "Y".

At step S650, the node may receive the IUA-uplink TX. As mentioned, above the IUA-uplink TX may also include a BSR. Further, the IUA-uplink TX may include data.

At step S660, the node may check if the BSR indicates that an amount of data to be transmitted by the UE 10 is above threshold amount of data. The threshold amount of data may be preconfigured or may be calculated in a dynamic manner, e.g., on the basis of a HARQ roundtrip time $T_{HRTT}$, in units of the time intervals with previously allocated uplink radio resources indicated by the IUA-uplink grant, and a size $S_{IUAG}$ of the IUA-uplink grant, i.e., the data capacity of the previously allocated uplink radio resources indicated by the IUA-uplink grant. For example, the threshold amount of data may be calculated according to:

$$\text{Threshold} = T_{HRTT} * S_{IUAG} + A, \qquad (1)$$

where A may be a constant or function that may be used to ensure that sending a D-uplink grant is only triggered if the amount of data still to be sent after the HARQ roundtrip time $T_{HRTT}$ is not too small.

If at step S660 the amount of data to be transmitted is not above the threshold amount of data, the method may return to step S630 for the next time interval, as indicated by branch If at step S660 the amount of data to be transmitted is above the threshold amount of data, the method may continue with step S670, as indicated by branch "Y".

At step S670, the node may check whether a D-uplink grant was already sent to the UE 10, but not yet utilized. If this is the case, the method may return to step S630 for the next time interval, as indicated by branch "Y".

If at step S670 it is found that there is no D-uplink grant which was sent to the UE 10, but not yet utilized, the method may continue with step S680 as indicated by branch "N".

At step S680, the node may send a new D-uplink grant to the UE 10. The size $S_{DG}$ of this new D-uplink grant may be determined on the basis of amount of data $V_B$ indicated in the BSR and the size $S_{IUAG}$ of the IUA-uplink grant, e.g., according to:

$$S_{DG} = V_B - T_{HRTT} * S_{IUAG}. \qquad (2)$$

After sending the D-uplink grant at step S680, the method may return to step S630 for the next time interval.

By the checks in steps S660 and S670 of FIG. 6, it can be avoided that a D-uplink grant is sent to the UE 10 which is actually not required. Specifically, the check of step S660 may ensure that the D-uplink grant is sent if transmission of the data on the previously allocated uplink radio resources indicated in the IUA-uplink grant is not possible before the D-uplink grant is received by the UE 10.

Figure 7:
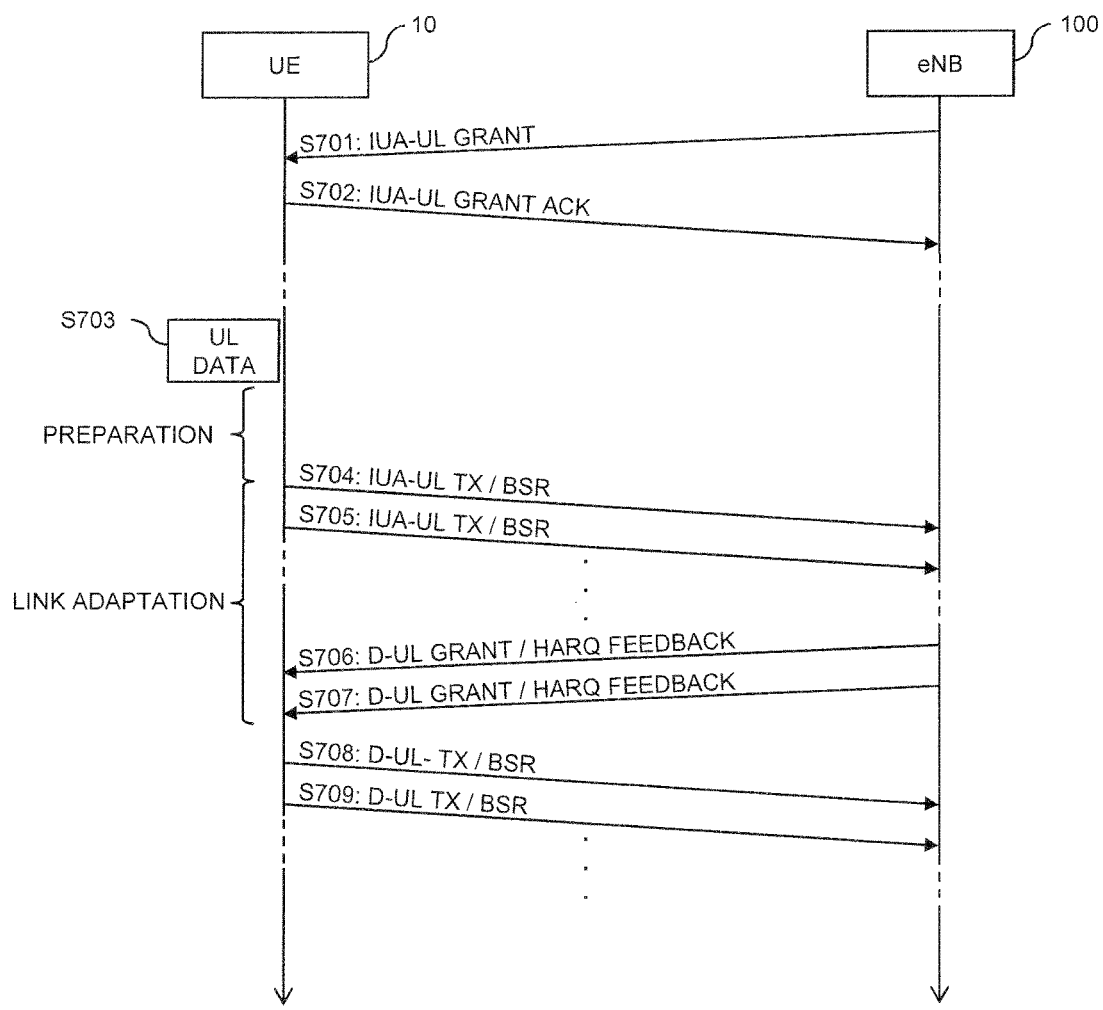
FIG. 7 schematically illustrates an exemplary sequence of processes when for performing uplink radio transmissions according to an embodiment of the invention.

FIG. 7 shows further a typical sequence of processes for performing uplink transmissions on the basis of the IUA-uplink grant. Also the processes of FIG. 7 involve the UE 10 and the eNB 100.

In the processes of FIG. 7, initially the eNB 100 sends a IUA-uplink grant to the UE 10 in step S701. The IUA-uplink grant indicates uplink radio resources allocated to the UE 10 in periodically reoccurring time intervals. In the example of FIG. 7, it is assumed that these IUA uplink radio resources are allocated in each subframe. The IUA-uplink grant of step S701 may be sent on the PDCCH.

The UE 10 then performs an initial IUA-uplink TX with an IUA-uplink grant acknowledgement in step S702. If the UE 10 has no data to transmit, the IUA-uplink grant acknowledgement may be a IUA-uplink TX with padding. The IUA-uplink grant acknowledgement of step S702 confirms receipt of the IUA-uplink grant in step S701 to the eNB 100. If the IUA-uplink grant acknowledgement of step S702 is not received by the eNB 100, the eNB 100 may resend the IUA-uplink grant of step S701. The usage of the IUA-uplink grant acknowledgement in step S702 is optional and may for example be configured during connection configuration, e.g., by the control information of step S201 of FIG. 2. The IUA-uplink grant may be valid for an open time duration, e.g., until de-configured by the eNB 100. Alternatively, also a validity period could be indicated together with the IUA-uplink grant in step S701 or in separate control information, such as the control information of step S201 of FIG. 2.

When data for transmission becomes available at the UE 10, the UE 10, as indicated by step S703, the UE 10 may prepare one or more IUA-uplink TXs on the previously allocated uplink radio resources of the IUA-uplink grant. FIG. 7 also illustrates a corresponding processing time, e.g., associated with layer 2 and layer 1 processing. If a BSR is triggered, the UE 10 may also add the BSR to the IUA-uplink TXs.

The UE 10 then perform IUA-uplink TXs in steps S704, S705 at the next time intervals with previously allocated uplink radio resources indicated by the IUA-uplink grant.

When the eNB 100 receives the IUA-uplink TXs of steps S704, S705, it may evaluate the included BSR to decide whether sending of one or more D-uplink grants to the UE 10 is appropriate, e.g., using processes as explained in connection with FIG. 6.

In the illustrated example, the eNB 100 sends D-uplink grants in steps S706 and S707 to the UE 10. As further illustrated, these D-uplink grants of steps S706, S707 may be accompanied by HARQ feedback with respect to the IUA-uplink TXs of steps S704, S705.

While performing the IUA-uplink TXs in steps S704, S705 and transmitting the D-uplink grants in steps S706, S707, the UE 10 and the eNB 100 may accomplish link adaptation of the radio connection between the UE 10 and the eNB 100, e.g., by selecting a suitable modulation and coding scheme (MCS) and/or transmission power. This link adaptation phase may last for about one HARQ roundtrip time, e.g., eight subframes. After that, a higher performance may be achieved due to optimized link adaptation.

The UE 10 may then continue performing uplink transmissions on the further allocated radio resources indicated by the D-uplink grants of steps S706, S707, as illustrated by D-uplink transmissions of steps S708 and S709. As illustrated, the D-uplink transmissions of steps S708, S709 may each include a BSR, so that further D-uplink grants may be issued to the UE 10 as long as it has data for transmission.

In the following, exemplary structures for realizing the network node 100, in particular when being embodied as a base station such as the eNB 100 described above, will be explained in more detail. Reference is made to the eNB 100 without loss of generality.

In FIG. 8, the eNB 100 is illustrated in more detail. The eNB 100 comprises at least one processor 101-1. The processor(s) 101-1 can receive messages from the UE 10 via an interface 101-2 of the eNB 100; an uplink channel 151 may be employed for this. The eNB 100, optionally operationally executed by the processor(s) 101-1, can also send messages to the UE 10 via the interface 101-2, e.g., by employing a downlink channel 152. The processor(s) 101-1 may be implemented as a multi-core processing entity or may rely on shared computing of the processors 101-1. The processor(s) 101-1 can be coupled with a memory 101-3 of the eNB 100. The memory 101-3 can be a volatile or non-volatile memory. The memory 101-3 can store program code to be executed by the processor(s) 101-1.

In FIG. 9, the UE 10 is illustrated in more detail. The UE comprises at least one processor 11-1. The processor(s) 11-1 can receive messages from the eNB 100 via an interface 11-2 of the UE 10; the downlink channel 152 may be employed for this. The UE 10, optionally operationally executed by the processor(s) 11-1 can also send messages to the eNB 100 via the interface 11-2, e.g., by employing the uplink channel 151. The processor(s) 11-1 may be implemented as a multi-core processing entity or may rely on distributed computing of the processors 101-1. The processor(s) 11-1 may be coupled with a memory 11-3 of the UE 10. The memory 11-3 can be a volatile or a non-volatile memory. The memory 11-3 can store a program code to be executed by the processor(s) 11-1.

In general, the logic of determining the effective amount of data may reside at the UE 10 and/or at the network side, respectively at the eNB 100. In other words, it is possible that the UE 10 performs techniques in order to determine the fraction of data; however, it is also possible that the eNB 100 which receives, e.g., a BSR indicating the total amount of data available in the uplink data buffer of the UE, performs to respective techniques of determining the fraction of the data. It is also possible that the respective logic is shared between the UE 10 and the eNB 100, i.e., both the UE 10 and the eNB 100 implement the respective logic.

The program code which is stored in at least one of the memories 11-3, 101-3 may enable to determine the fraction of the data available in the uplink data buffer, i.e., enable to determine an effective amount of data for which allocation of the further uplink radio resources is considered.

In FIG. 10, an uplink data buffer 400 of the UE 10 is shown. Data 110 is present in the uplink data buffer 400. In FIG. 10, a height of the bar indicates the amount of the data 110. The data 110 is scheduled for transmission on the uplink channel 151 from the UE 10 to the eNB 100. For this, the previously allocated uplink radio resources and optionally the further uplink radio resources may be employed.

Figure 11:
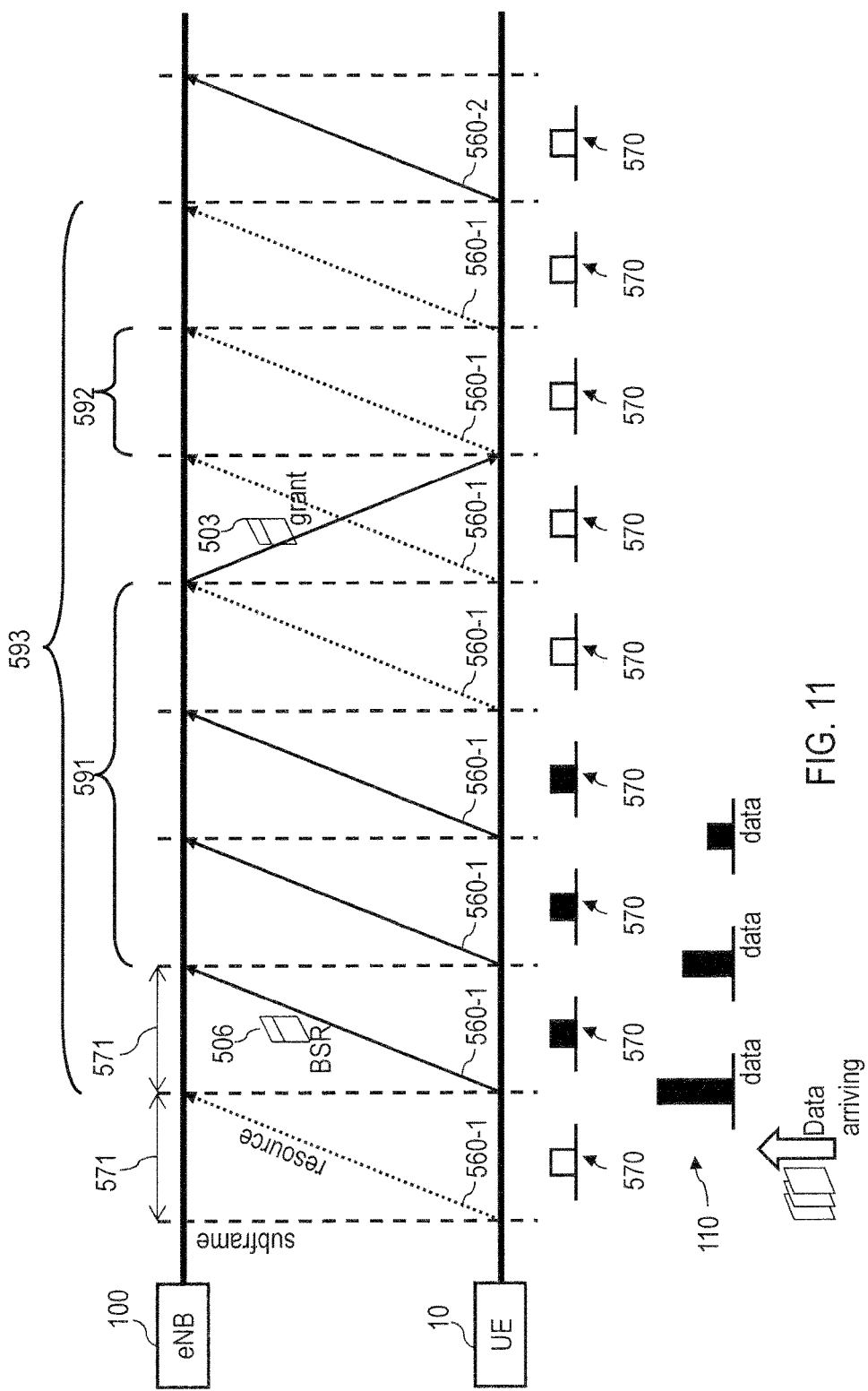
FIG. 11 is a signalling diagram which illustrates sending of a BSR and uplink transmission of the data in the uplink data buffer of FIG. 10 according to an embodiment of the invention.

Turning to FIG. 11, a scenario is shown where the uplink transmission is performed for the data 110. FIG. 11 is a signalling diagram of data transmission between the UE 10 and the eNB 100. The data transmission occurs for subframes 571 (indicated in FIG. 11 by the vertical dashed lines). The subframes 571 have a certain duration, e.g., in case of the 3GPP LTE radio access technology a duration of 1 ms.

As can be seen from FIG. 11, uplink radio resources 560-1 have been previously allocated to the UE 10 in periodically reoccurring time intervals 570; in this scenario, the time intervals 570 periodically reoccur every subframe 571. However, scenarios are possible where the time intervals 570 reoccur every second, third, fourth, etc. subframe 571. In general, it is not necessary that the time intervals 570 previously allocated uplink radio resources 560-1 occur with a strict periodicity.

Each previously allocated uplink radio resource 560-1 is associated with a certain amount of data 110 which may be transmitted in the corresponding time interval 570. The previously allocated uplink radio resources 560-1 have been indicated in an IUA-uplink grant (not shown in FIG. 11) previously transmitted from the eNB 100 to the UE 10.

In the scenario of FIG. 11, the UE 10 does not have data 110 to transmit in the first subframe 571 (indicated on the left-hand side of FIG. 11). The respective previously allocated uplink radio resources 560-1 are not employed for transmission of data (indicated by the dotted diagonal arrow in FIG. 11). The UE 10 may not send any signals at all; it is also possible that the UE 10 sends logical zeros which may correspond to padded data as explained above.

Then, data 110 arrives in the uplink data buffer 400 and becomes available for the uplink transmission; consequently, the UE 10 employs the previously allocated uplink radio resources 560-1 of the second, third, and fourth subframe 571 to transmit the data 110, i.e., IUA-uplink TX is executed (indicated by the full arrow in FIG. 11). E.g., the data 110 initially scheduled for transmission may amount to 300 Bytes in total. Then, per time interval 570, 100 Bytes may be transmitted to the eNB 100. Such a scenario may occur in cases where the UE 10 has a comparably small amount of the data 110 to transmit, as can be the case for higher layer control signalling such as Transmission Control Protocol (TCP) Acknowledgments.

When the data 110 becomes available in the uplink data buffer 400, the UE 10 further sends the BSR 506 to the eNB 100. This is to inform the eNB 100 of the amount of the data 110 in the uplink data buffer 400; based on this information, the eNB 100 can selectively grant the further radio resources 560-2. Optionally, the UE 10 may also send a scheduling request to the eNB 100 (not shown in FIG. 11).

Above, the trigger criterion to send the BSR 506 is the data 110 becoming available in the uplink data buffer 400. In general, there may be further criterions which trigger the sending of the BSR 506. E.g., it is possible that the BSR 506 is sent if, prior to the data 110 becoming available in the uplink data buffer 400, no further data at least of equal transmission priority as the data 110 is in the uplink data buffer 400. Sometimes, the uplink data buffer 400 may be structured into queues; a queue may correspond to a certain type of the data 110 and/or the data 110 having a certain transmission priority 110. A queue may also be referred to as a logical channel group. It is possible to take into account the data 110 associated with the various queues as the trigger criterion for the sending of the BSR 506. Another trigger criterion for sending of the BSR 506 may be generally to update information of the eNB 100 on the current status of the uplink data buffer 400; this may occur, e.g., at fixed time intervals. E.g., a respective timer may be implemented. E.g., the time interval of the respective timer may range from 5 ms to up to 2.45 seconds; the timer may be disabled by setting its timer value to infinity. A further trigger criterion may be to provide robustness of the transmission of the BSR 506. Deadlock situations should be avoided where a BSR 506 is sent but not acknowledged. A retransmission timer may be implemented and may range, e.g., from 320 ms up to 10.24 s.

In the scenario of FIG. 11, the BSR 506 indicates the entire amount of data 110 in the uplink data buffer 400 and does not distinguish between various queues. The eNB 100 receives the BSR 506 and processes the BSR 506. For the processing of the BSR 506, a certain processing time 591 is required at the eNB 100. Then, the eNB 100 sends a D-uplink grant 503 to the UE 10; the D-uplink grant 503 allocates the further resources 560-2 to the UE 10. These further resources 560-2 are allocated to UE 10 at a later subframe 571 which has a sufficient temporal distance to the receiving of the uplink grant 503 by the UE 10 to take into account a processing time 592 at the UE 10.

Various parameters may be taken into account with respect to the time period 593. E.g., a signalling time between the UE 10 and the eNB 100 can be taken into account. Alternatively or additionally, the processing time 592 at the UE 10 can be taken into account. Alternatively or additionally, the processing time 591 at the eNB 100 can be taken into account.

Alternatively or additionally, a signalling time between the eNB 100 and the UE 10 can be taken into account. In various scenarios, the overall time period 593 between sending of the BSR 506 and the subframe 571 associated with the first occurrence of the further uplink resources 560-2 corresponds to a round-trip time of signalling between the UE 10 and the eNB 100 according to an error-correcting repeat request scheme of the uplink transmission. The round-trip time of signalling typically takes into account signalling time required for the uplink transmission, e.g., of the BSR 506, as well as signalling time required for the downlink transmission of, e.g., the D-uplink grant 503. The round-trip time typically further takes into account the processing times 591, 592 at the UE 10 and the eNB 100. E.g., the error-correcting repeat request scheme can be a Hybrid automatic repeat request scheme (HARQ) which employs forward error correction (FEC). E.g., the HARQ round-trip time can amount to 8 ms in the LTE radio access technology.

As can be seen from FIG. 11, because of the limited amount of the data 110 scheduled for uplink transmission, at the time that uplink transmission employing the further uplink radio resources 560-2 becomes possible, the uplink data buffer 400 of the UE 10 has already emptied; there is no more data 110 for which D-uplink TX is required. Then, the UE 10 may send no data or padded data on the further uplink radio resources 560-2. This is because—during the time period 593—the data 110 has been transmitted employing the previously allocated uplink radio resources 560-1. Such a scenario may in particular occur, if there is a comparably large number of time intervals 570 with associated previously allocated uplink radio resources 560-1 within in the time period 593; in general terms the aforementioned scenario may occur, if a temporal distance between subsequent previously allocated uplink radio resources 560-1 is smaller or on the order of the time period 593. As can be seen from FIG. 11, in general it is possible that a periodicity between the periodically reoccurring time intervals 570 of the previously allocated uplink radio resources 560-1 is shorter than the time period 593. Where the previously allocated uplink radio resources 560-1 are not allocated with a fixed periodicity, it is generally possible that a temporal separation between subsequent ones of the previously allocated uplink radio resources 560-1 is shorter than the time period 592.

Figure 12:
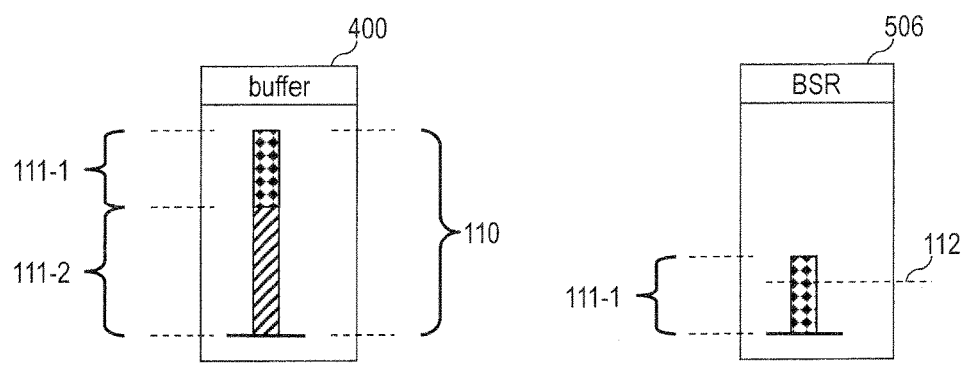
FIG. 12 is a schematic representation of the uplink data buffer of the UE according to an embodiment of the invention, the uplink data buffer including data scheduled for uplink transmission to the cellular network, wherein a fraction of the data which is indicated by the BSR is highlighted.

As mentioned above, instead of indicating the total data 110 available for the uplink transmission in the uplink buffer, it is possible that the BSR 506 indicates a fraction of the data. In other words, an effective amount of data may available in the uplink buffer may be determined. Turning to FIG. 12, according to various embodiments, the fraction 111-1 of the total data 110 which are to be sent using, e.g., a D-uplink grant is indicated in the BSR 506. I.e., the fraction 111-1 amounts to less than the total data 110 in the uplink data buffer 400.

The fraction 111-1 is complementary to a further fraction 111-2 of the data 110 which are to be sent using the previously allocated resources. In this respect, "complementary" may relate to the fact that adding the fraction 111-1 and the further fraction 111-2 gives the total amount of the data 110. In other words, it is possible to transmit the further fraction 111-2 of the data 110 within the time period 593 employing the previously allocated uplink radio resources 560-1. The remainder of the data 110 which cannot be transmitted within the time period 593 employing the previously allocated uplink radio resources 560-1 corresponds to the fraction 111-1 of the data.

In general, the fraction 111-1 of the data 110 available in the uplink data buffer 400 can be determined depending, first, on the data 110 in the uplink data buffer 400, and, second, on the previously allocated uplink radio resources 560-1 for the uplink transmission in the reoccurring time intervals 570. Here, it is possible to take into account, e.g., a frequency of occurrence of the reoccurring time intervals 570—in the case of FIG. 11 every subframe 571. Alternatively or additionally, an amount of data per reoccurring time interval 570 which can be transmitted employing the previously allocated uplink radio resources 560-1 may be taken into account. Alternatively or additionally, it is possible to take into account the time period 593. E.g., the time period 593 may be pre-determined or negotiated between the UE 10 and the eNB 100. As can be seen from FIG. 11, the time period 593 corresponds to a multiple of a duration of a single subframe 571 and hence includes a plurality of the time intervals 570.

As has been shown above, the signalling of the BSR 506 prompts or requests the allocation of the further radio resources 560-2. It is possible that in addition to the BSR 506—which may act at least as an implicit request for the D-uplink grant 503 which indicates the further uplink radio resources 560-2—a further dedicated request message, i.e., the scheduling request, is sent (not shown in FIG. 11). Then, the UE 10 receives the requested D-uplink grant 503 and performs the D-uplink TX of at least parts of the fraction 111-1 of the data 110 employing the further uplink radio resources 560-2. Also, the sending of at least parts of the data 110 employing the previously allocated uplink radio resources 560-1 may serve as an implicit request for the allocation of the further uplink radio resources 560-2 and the sending of the D-uplink grant 503.

Figure 13:
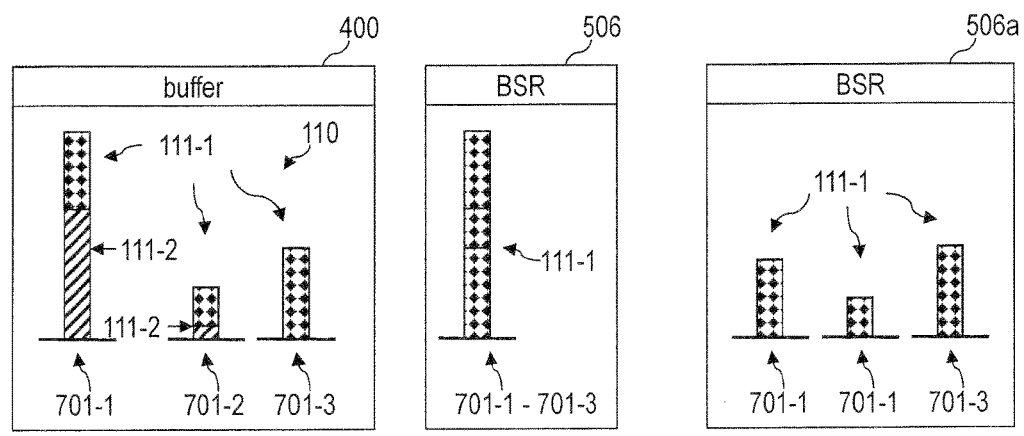
FIG. 13 corresponds to FIG. 12, wherein the data in the uplink data buffer is distinguished between various queues.

As indicated in FIG. 13, right hand side, it is possible that the fraction 111-1 falls below a threshold amount of data 112. Then, it might be unnecessary to send the BSR 506; i.e., depending on a threshold comparison of the fraction 111-1 of the data 110 with the threshold amount of data 112, it is possible to selectively send the BSR 506. Alternatively or additionally, it is possible that the eNB 100 does not send the D-uplink grant 503 depending on the threshold comparison of the fraction 111-1 with the threshold amount of data 112. Therefore, it is possible that the UE 10 does not receive the requested D-uplink grant 503 if the fraction 111-1 of the data 110 is smaller than the threshold amount of data 112. The sending of the data 110 may then be completed employing the previously allocated uplink radio resources 560-1, i.e., via IUA-uplink TX.

In FIG. 13, a scenario corresponding to the scenario of FIG. 12 is illustrated where the uplink data buffer 400 is structured into three queues 701-1-701-3; here, the data 110 of the various queues 110 may correspond to different higher layer applications and/or data 110 of different transmission priority. As can be seen from FIG. 13, the fraction 111-1 and the further fraction 111-2 can be individually determined for each one of the queues 701-1-701-3. It is then possible to send the BSR 506 indicating the sum of the fractions 111-1 of the various queues, i.e., not resolving the information on the various queues 701-1-701-3 in the BSR 506 (shown in FIG. 13, middle). However, it is also possible to send a so-called long BSR 506a which resolves the fraction 111-1 on a per-queue 701-1-701-3 basis (shown in FIG. 3, right hand side).

In this scenario, the fraction 111-1 of queue 701-1-701-3, s may be calculated as follows:

$$BSR_s = \max\left[0, CurrentQueueBufferStatus_s - \sum_{T<j<T+t} ToTransmitOnIUAResourceBits_{sj}\right] + X.$$

CurrentQueueBufferStatus$_s$ is the current number of bits left in queue 701-1-701-3, s, i.e., the total amount of the data 110 per queue 701-1-701-3, s. The relevant point in time for CurrentQueueBufferStatus$_s$ may be defined to correspond to immediately after sending of a current subframe 571.

Figure 15:
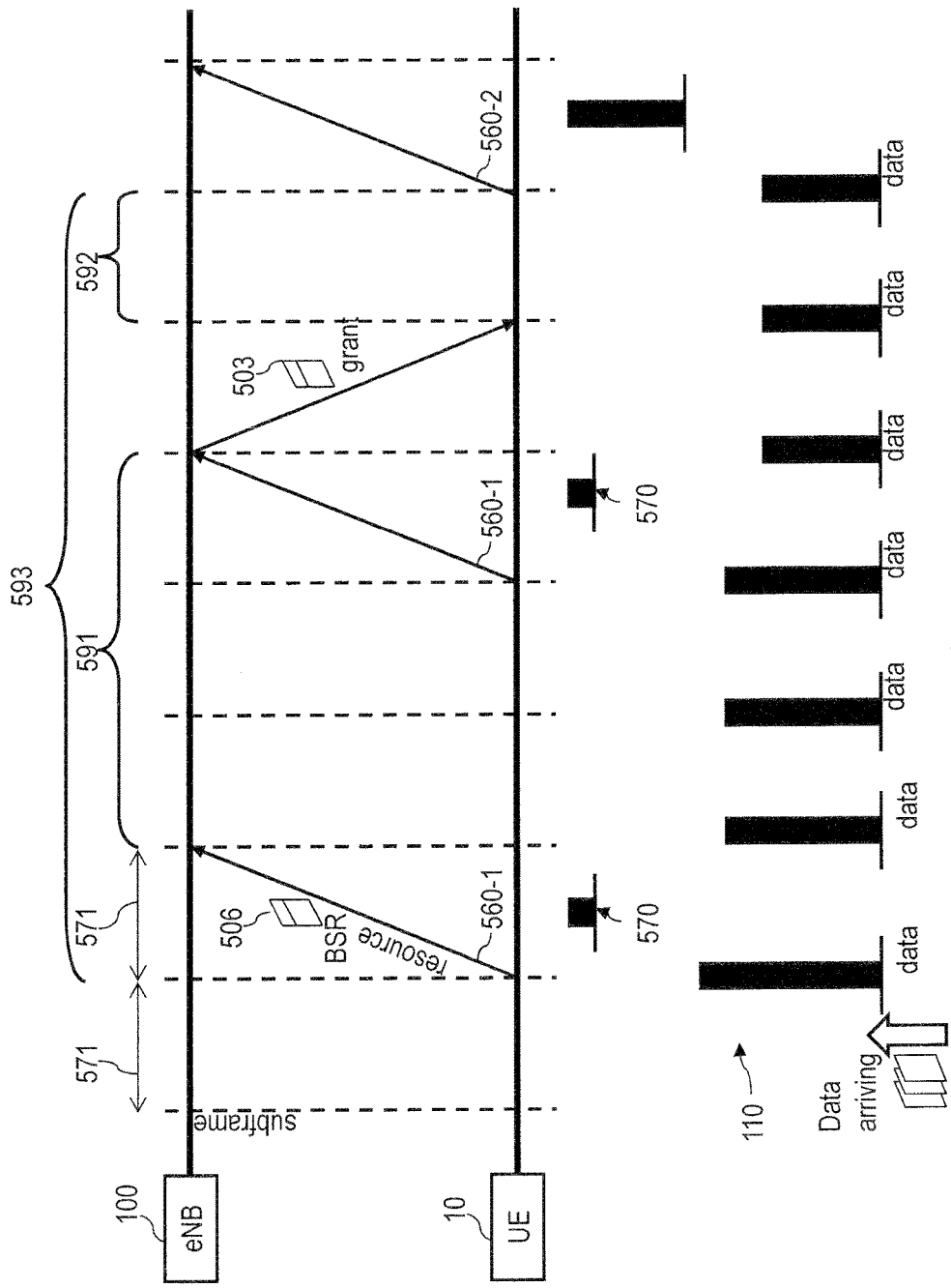
FIG. 15 is a signalling diagram which illustrates sending of a BSR and uplink transmission of the data in the uplink data buffer according to an embodiment of the invention.

T is the current time, respectively the index of a time interval 570; in the examples of FIGS. 11 and 15 T can index a specific subframe 571. t is the time period 593.

ToTransmitOnIUAResourceBits$_{sj}$ is the current number of bits of queue 701-1-701-3, s to be transmitted on the previously allocated uplink radio resources 560-1 in time interval 570, j, takina into account the amount of resources granted in subframe j. In other words, $$\sum_{T<j<T+t} ToTransmitOnIUAResourcesBits_{sj}$$

may correspond to the further fraction 111-2 of the data 110 which can be transmitted within the time period 398 employing the previously granted uplink radio resources 560-1 via IUA-uplink TX. It is a data capacity of the previously allocated uplink radio resources indicated by the IUA-uplink grant within the time period 398.

X is a parameter which may be used to take into account incoming bits to be received by the uplink data buffer 400 from the upper protocol layers within time period 593, t.

Then, the BSR 506 may indicate $$\sum_s BSR_s$$

(cf. middle part of FIG. 13) or the BSR 506*a* may indicate each BSR$_s$ individually (cf. right hand side of FIG. 13).

It is noted that each queue 701-1-701-3 may be sub-structured into further sub-queues (not shown in FIG. 13), sometimes also referred to as logical channels. Then it may be required to sum over the various sub-queues per queue 701-1-701-3 when calculating BSR$_s$.

As mentioned above, the above-stated formula may be applied at the UE 10. The above-stated formula may be equally applicable if the determining of the fraction 111-1 is executed at the UE 10 and/or the eNB 100. E.g., if the above-stated formula is executed at the eNB 100, the value CurrentQueueBufferStatus$_s$ may be obtained from the received BSR 506, 506*a*. In such a case, a different value may be used for the time period 398, e.g., taking into account that the signalling time between UE 10 and eNB 100 has already lapsed.

Generally, it is even possible to share the decision logic for determining the fraction 110-1 between the UE 10 and the eNB 100. E.g., the UE 10 may execute the determination of the fraction 111-1 taking into account a first time period t and the eNB 100 may execute the determination of the fraction 111-1 taking into account a second time period t' with adapted current time T. It is possible that the second time period t' is successive to the first time period t. E.g., the first time period t may take into account a signalling time from the UE 10 to the eNB 100 and a processing time of the UE 10. E.g., the second time period t' may take into account a signalling time from the eNB 100 to the UE 10 and a processing time of the eNB 100. Thereby, it may be unnecessary to exchange information on the respective processing times between the eNB 100 and the UE 10.

As can be seen, various parameters—such as the time period 398, properties of the previously granted uplink radio resources 560-1, etc.—may be relied upon when determining the fraction 111-1. Considering a scenario where at least parts of the decision logic for determining the fraction 111-1 reside at the UE 10, it is possible that these parameters are pre-configured into the UE 10, e.g., into the memory 11-3. Then the processor 11-1 of the UE 10 may readily determine the fraction 111-1. Alternatively or additionally, it is possible that the various parameters are configured by the cellular network. E.g., some or all of the parameters as illustrated above may be received by the processor 11-1 of the UE 10 via the interface 11-2 from the eNB 100. E.g., this may occur as part of radio resource control (RRC) signalling. It is also possible to signal some or all of the parameters as part of an uplink grant which grants the uplink radio resources 560-1 in the reoccurring time intervals 571, i.e., a IUA uplink grant; for this the Physical Downlink Control Channel (PDCCH) of the 3GPP LTE air interface may be employed.

Also for a scenario where at least parts of the logic for determining the fraction 111-1 of the data 110 reside at the eNB 100 the parameters may be pre-configured into the eNB 100 and/or may be negotiated between the eNB 100 and the UE 10.

Figure 14:
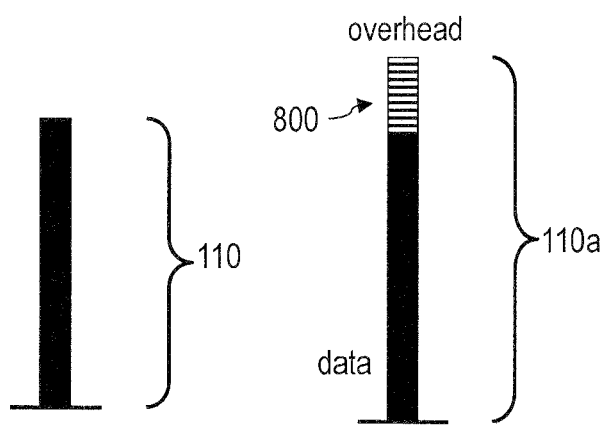
FIG. 14 is a schematic representation of an uplink data buffer of the UE according to an embodiment of the invention, wherein data scheduled for uplink transmission to the cellular network is available in the uplink data buffer, wherein overhead of the data is illustrated.

For the uplink transmission, typically overhead 800 is added to the data 110 and the effective data 110*a* to be transmitted is larger than the data 110 in the uplink buffer 400, cf. FIG. 14. It is possible to determine the fraction 111-1 of the data 110 further depending on the overhead 800. E.g., the overhead 800 may correspond to packet headers added to data packets which carry the data 110 as payload. Typically, the lower protocol layers add such overhead 800. E.g., a so-called Medium Access Network (MAC) header may be added. Also a so-called Physical (PHY) header may be added.

E.g., the value ToTransmitOnIUAResourceBits in the above-stated formula may be effectively reduced, because—when considering the overhead 800—less of the data 110 may be transmitted employing the previously allocated uplink radio resources 560-1 per time. In other words, it is possible that the further fraction 111-2 of the data 110 is determined by correlating the previously allocated uplink radio resources 560-1 of the time intervals 570 which are included in the time period 592 with the data 110 available in the uplink data buffer 400 and with the corresponding overhead 800. By considering the overhead 800, a more accurate allocation of the further resources 560-2 becomes possible.

Once the fraction 111-1 has been determined, the eNB 100 may allocate the further uplink radio resources 560-2 based on the fraction 111-1. E.g., the further uplink radio resources 560-2 may be sized to allow fast transmission of the fraction 111-1 via D-uplink TX. This allocation of the further uplink radio resources 560-2 may be done taking into account D-uplink grants which have already been granted to the UE 10, but for which no data has been yet received from the UE 10. The eNB 100 may the schedule an adjusted amount of the further uplink radio resources 560-2 given by $$ToScheduleBits = \sum_s BSR_s - \sum DedicatedGrantBitsNotReceived$$

where DedicatedGrantBitsNotReceived are previously granted further uplink radio resources for which no data has been yet received by the eNB 100 via D-uplink TX.

It is again referred to the scenario of FIG. 11. When employing techniques of determining the fraction 111-1 as illustrated above, one finds that in this scenario of FIG. 11 the fraction 111-1 of the data 110 amounts to zero. In particular, the uplink data buffer 400 is empty once the time period 593 has elapsed after the sending of the BSR 506, 506a which can be predicted, e.g., by employing the above-stated formula. All of the data 110 has been transmitted employing the previously granted uplink radio resources 560-1, i.e., by IUA-uplink TX. Because the fraction 111-1 of the data 110 is zero, it is typically preferable that the eNB 100 does not allocate the further resources 560-2 and does not send the D-uplink grant 503. E.g., the BSR 506, 506a may indicate the fraction 111-1. It is also possible that the BSR 506, 506a indicates the total amount of the data 110 in the uplink data buffer 400 of the UE 10; then the eNB 100 can be configured to determine the fraction 111-1.

Above, techniques of determining the fraction 111-1 of the data 110 have been illustrated; when such techniques are applied, a scenario as indicated in FIG. 15 may occur. FIG. 15 generally corresponds to FIG. 11; however, the amount of the data 110 in the uplink data buffer 400 is larger in the scenario of FIG. 15 if compared to the scenario of FIG. 11. Further, the time intervals 570 previously allocated to the UE 10 only occur every third subframe 571, i.e., every 3 ms in the case of the 3GPP LTE radio access technology. Therefore, less data 110 per time may be transmitted on the uplink channel 151 employing the previously granted uplink radio resources 560-1, i.e., via IUA-uplink TX.

In FIG. 15, the BSR 506, 506a indicates the fraction 111-1 of the data 110. Because of this, the D-uplink grant 503 sent by the eNB 100 allocates the further resources 560-2 which match the indicated fraction 111-1 of the data 110 (indicated in FIG. 15 by the bar underneath the further resources 560-2 which has a size that matches the remaining data 110 in the buffer 400). The further resources 560-2 are not granted in excess of what is actually required after the time period 593 has elapsed. In such a case, channel resources can be saved as the uplink grant 503 is not unnecessarily large. D-uplink TX can be performed on the further resources 560-2 which are matched to the required amount of data.

Figure 16:
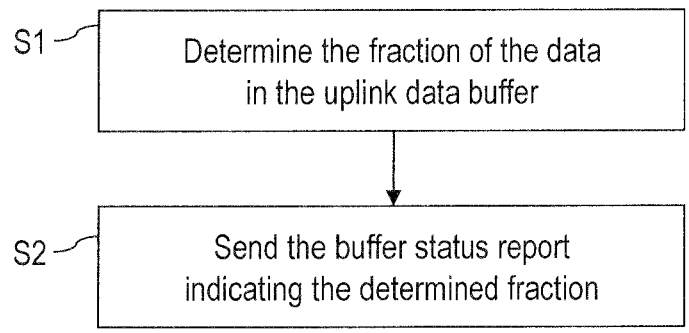
FIG. 16 is a flowchart of a method of controlling sending of a BSR according to an embodiment of the invention.

In FIG. 16, a flowchart of a method of sending the BSR 506, 506a is illustrated. First, the processor 11-1 of the UE 100 determines the fraction 111-1 of the data 110 in the uplink data buffer 400. For this, the processor 11-1 takes into account the data 110 available in the uplink data buffer 400, e.g., the entire amount of the data 110. Further, in step S1, the processor 11-1 takes into account the uplink radio resource 560-1 previously allocated to the UE 10 for the uplink transmission in the reoccurring time intervals 570. E.g., the processor 11-1 can further take into account a time period 593 in step S1; the time period 593 may correspond to the round-trip time of signalling between the UE 10 and the eNB 100 according to the error-correcting repeat request scheme of the uplink transmission. E.g., the processor 11-1 of the UE 10 may be configured to calculate the fraction 111-1 according to the above-stated formula.

Next, in step S2, the BSR 506, 506a is sent via the interface 11-2 to the eNB 100. The BSR 506, 506a indicates the determined fraction 111-1 of the data 110 in the uplink data buffer 400. It is possible that the BSR 506, 506a resolves the fraction 111-1 for the various queues 701-1-701-3.

Figure 17:
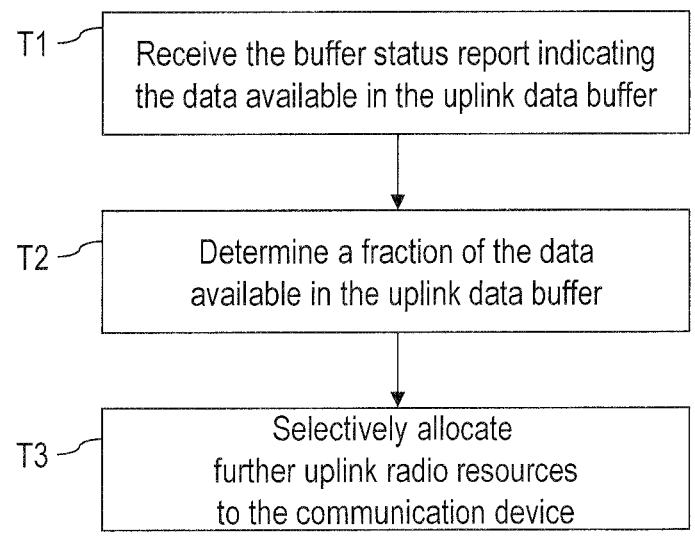
FIG. 17 is a flowchart of a method of controlling allocation of further radio resources to a UE according to an embodiment of the invention.

Accordingly, in the scenario discussed above with respect to FIG. 16, most of the decision logic when determining the effective BSR 506, 506a indicating the fraction 111-1 of the data 110 resides in the UE 10. However, it is also possible that at least parts of the decision logic for determining the fraction 111-1 reside at the network side; e.g., the processor 101-1 of the eNB 100 can be configured to determine the fraction 111-1 of the data 110. Such a scenario is illustrated in the flowchart of FIG. 17; the flowchart illustrates a method of controlling allocation of the further uplink radio resources 560-2 for the uplink transmission from the UE 10 to the cellular network. Here, in step T1, the eNB 100 receives the BSR 506, 506a which indicates the data 110 available in the uplink data buffer 400. I.e., the BSR 506, 506a in the scenario of FIG. 17 indicates the total amount of the data 110 in the buffer 400 of the UE 10. Then, in step T2, the processor 101-1 of the eNB 100 is configured to determine the fraction 111-1 of the data 110. In general, it is possible that similar or corresponding techniques are employed by the processor 101-1 of the eNB 100 to determine the fraction 111-1 of the data 110 as have been discussed above with respect to a scenario where this logic resides at the UE 10. In other words, it is possible that the processor 101-1 is configured to determine the fraction 111-1 depending on the data 110 as indicated by the BSR 506, 506a received in step T1; and further depending on the uplink radio resources 560-1 previously allocated to the UE 10 for the uplink transmission in reoccurring time intervals 570. It is possible to employ the above-stated formula to determine the fraction in step T2.

Then, in step T3, the further uplink radio resources 560-2 are selectively allocated to the UE 10 for the uplink transmission of at least parts of the determined fraction 111-1 of the data 110. E.g., it is possible that the processor 101-1 is configured to selectively execute said allocating of the further uplink radio resources 560-2 if the determined fraction 111-1 of step T2 is larger than zero. In other words, if it is determined that after lapsing of the time period 593 the amount of the data 110 in the uplink data buffer 400 of the UE 100 is larger than zero—i.e., not all of the data 110 is transmitted employing the previously allocated uplink radio resources 560-1—the D-uplink grant 503 may be sent and the further uplink radio resources 560-2 can be allocated to UE 10.

It is also possible to selectively allocate the further uplink radio resources 560-1 depending on a threshold comparison of the fraction 111-1 of the data 110 with the threshold amount of data 112. The threshold amount of data 112 may be pre-configured. If the fraction 111-1 exceeds the threshold amount of data 112, the further uplink radio resources 560-2 may be allocated.

The threshold amount of data 112 may be pre-configured and fixed. The threshold amount of data may be zero or a fixed value above zero. It is also possible to dynamically determine the threshold amount of data 112. In general, there are various scenarios conceivable for said determining of the threshold amount of data 112. E.g., the threshold amount of data 112 may be determined based on the previously allocated uplink radio resources 560-1 of the time intervals 570 included in a further time period. E.g., the further time period may correspond to the time period 593 or may be of the same order of magnitude as the time period 593 such as n times the time period 593. In such a case, it may be assumed that the uplink transmission of the data 110 remaining in the uplink data buffer 400 may be completed within a reasonable time by relying on the previously granted uplink radio resources 560-1, i.e., without allocating the further uplink radio resources 560-2 by sending the D-uplink grant 503. Specifically, the threshold amount of data may correspond to the amount of data to be transmitted employing IUA-uplink TX in the selected further time period. Thereby, an efficient and flexible allocation of the further uplink radio resources 560-2 may be achieved.

In step T3, the further uplink radio resources 560-2 are allocated depending on the fraction 111-1. The D-uplink grant 503 is sent.

Summarizing, above various techniques have been described which can make the uplink transmission and resource usage more efficient. Control channel resources can be reduced. A power consumption of the UE and/or the eNB may be reduced by avoiding processing of unnecessary messages such as data and/or grants. When employing previously allocated uplink radio resources in reoccurring time intervals, an adjusted BSR can be determined by the UE and/or the amount of data in the uplink data buffer as indicated by the BSR received by the eNB can be adjusted at the network side. This allows to take into account that during inherent latency between sending of the BSR and the receiving and processing of an D-uplink grant granting further uplink radio resources to the UE for the uplink transmission of the data in the uplink buffer, the UE commences sending the data employing the previously allocated uplink radio resources. It is possible to more accurately allocate the further uplink radio resources.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

The invention claimed is:

1. A method, by a communication device, of controlling sending of a buffer status report from the communication device to a cellular network, the method comprising:
   depending on a total amount of data available in an uplink data buffer of the communication device for uplink transmission and further depending on uplink radio resources previously allocated to the communication device for the uplink transmission in reoccurring time intervals, determining a fraction of the total amount of data available in the uplink data buffer; and
   sending the buffer status report to the cellular network, the buffer status report indicating the determined fraction of data,
   wherein the determined fraction of data amounts to less than the total amount of data available in the uplink data buffer.

2. The method according to claim 1,
   wherein determining the fraction of data further depends on a time period that is pre-determined or negotiated between the communication device and the cellular network, the time period including a plurality of the time intervals.

3. The method according to claim 2, further comprising:
   determining a further fraction of the total amount of data available in the uplink data buffer,
   wherein the uplink transmission of the further fraction of data is possible by employing the previously allocated uplink radio resources of the time intervals included in the time period, and
   wherein the fraction of data is complementary to the further fraction of data.

4. The method according to claim 2,
   wherein the time period corresponds to a predefined round-trip time of signalling between the communication device and a base station of the cellular network according to an error-correcting repeat request scheme of the uplink transmission.

5. The method according to claim 1,
   wherein said sending of the buffer status report is in response to the data becoming available in the uplink data buffer.

6. The method according to claim 5,
   wherein the buffer status report is sent in response to determining that, prior to the data becoming available in the uplink data buffer, no further data at least of equal transmission priority as the data is in the uplink data buffer.

7. The method according to claim 1, further comprising:
   in response to the data becoming available in the uplink data buffer, requesting an uplink grant, the uplink grant indicating further uplink radio resources allocated to the communication device for the uplink transmission of at least parts of the fraction of the data;
   selectively receiving the requested uplink grant; and
   in response to receiving the requested uplink grant, performing the uplink transmission of the at least parts of the fraction of data by employing the further uplink radio resources.

8. A communication device configured to control sending of a buffer status report from the communication device to a cellular network, the communication device comprising:
   at least one processor configured to, depending on a total amount of data available in an uplink data buffer of the communication device for uplink transmission and further depending on uplink radio resources previously allocated to the communication device for the uplink transmission in reoccurring time intervals, determine a fraction of the total amount of data available in the uplink data buffer; and
   an interface circuit configured for communication with the cellular network, wherein the at least one processor is further configured to:
   send the buffer status report via the interface circuit to the cellular network, the buffer status report indicating the determined fraction of data,
   wherein the determined fraction of data amounts to less than the total amount of data available in the uplink data buffer.

9. The communication device according to claim 8,
   wherein the at least one processor is configured to:
   determine the fraction of data further depending on a time period that is pre-determined or negotiated between the communication device and the cellular network, the time period including a plurality of the time intervals.

10. The communication device according to claim 9,
    wherein the at least one processor is configured to:
    determine a further fraction of the total amount of data available in the uplink data buffer,
    wherein the uplink transmission of the further fraction of data is possible by employing the previously allocated uplink radio resources of the time intervals included in the time period, and
    wherein the fraction of data is complementary to the further fraction of data.

11. The communication device according to claim 9,
    wherein the time period corresponds to a predefined round-trip time of signalling between the communication device and a base station of the cellular network according to an error-correcting repeat request scheme of the uplink transmission.

12. The communication device according to claim 8,
    wherein the at least one processor is configured to:
    send the buffer status report in response to the data becoming available in the uplink data buffer.

13. The communication device according to claim 12,
    wherein the at least one processor is configured to:
    send the buffer status report in response to determining that, prior to the data becoming available in the uplink data buffer, no further data at least of equal transmission priority as the data is in the uplink data buffer.

14. The communication device according to claim 8, wherein the at least one processor is configured to:
in response to the data becoming available in the uplink data buffer, request an uplink grant, the uplink grant indicating further uplink radio resources allocated to the communication device for the uplink transmission of at least parts of the fraction of data;
selectively receive the requested uplink grant; and
in response to receiving the requested uplink grant, perform the uplink transmission of the at least parts of the fraction of data employing the further uplink radio resources.

15. A method, by a network node, of controlling allocation of further uplink radio resources for an uplink transmission from a communication device to a cellular network, the method comprising:
receiving a buffer status report from the communication device, the buffer status report indicating a total amount of data available in an uplink data buffer of the communication device for the uplink transmission;
depending on the total amount of data available in the uplink buffer and further depending on uplink radio resources previously allocated to the communication device for the uplink transmission in reoccurring time intervals, determining a fraction of the total amount of data; and
depending on the determined fraction of data, selectively allocating, to the communication device, the further uplink radio resources for the uplink transmission of at least parts of the determined fraction of data,
wherein the determined fraction of data amounts to less than the total amount of data available in the uplink data buffer.

16. The method according to claim 15,
wherein determining the fraction of data further depends on a time period which is pre-determined or negotiated between the communication device and the cellular network, the time period including a plurality of the time intervals.

17. The method according to claim 16, further comprising:
determining a further fraction of the total amount of data available in the uplink data buffer,
wherein the uplink transmission of the further fraction of data is possible by employing the previously allocated uplink radio resources of the time intervals included in the time period, and
wherein the fraction of data is complementary to the further fraction of data.

18. The method according to claim 16,
wherein the time period corresponds to a predefined round-trip time of signalling between the communication device and a base station of the cellular network according to an error-correcting repeat request scheme of the uplink transmission.

19. The method according to claim 15,
wherein said allocating of the further uplink radio resources is selectively executed in response to determining that the determined fraction of data is larger than zero.

20. The method according to claim 15, further comprising:
in response to said allocating, sending an uplink grant to the communication device, the uplink grant indicating the further uplink radio resources.

21. A network node for a cellular network, the network node being configured to control allocation of further uplink radio resources for an uplink transmission from a communication device to the cellular network, the network node comprising:
an interface circuit configured for communication with the communication device; and
at least one processor configured to receive, via the interface circuit, a buffer status report from the communication device, the buffer status report indicating a total amount of data available in an uplink data buffer of the communication device for the uplink transmission,
wherein the at least one processor is further configured to:
determine a fraction of the total amount of data depending on the total amount of data and further depending on uplink radio resources previously allocated to the communication device for the uplink transmission in reoccurring time intervals,
depending on the determined fraction of data, selectively allocate the further uplink radio resources to the communication device for the uplink transmission of at least parts of the determined fraction of data,
wherein the determined fraction of data amounts to less than the total amount of data available in the uplink data buffer.

22. The network node according to claim 21, wherein the at least one processor is configured to:
determine the fraction of data further depending on a time period that is pre-determined or negotiated between the communication device and the cellular network, the time period including a plurality of the time intervals.

23. The network node according to claim 22, wherein the at least one processor is configured to:
determine a further fraction of the total amount of data available in the uplink data buffer,
wherein the uplink transmission of the further fraction of data is possible by employing the previously allocated uplink radio resources of the time intervals included in the time period, and
wherein the fraction of data is complementary to the further fraction of data.

24. The network node according to claim 22,
wherein the time period corresponds to a predefined round-trip time of signalling between the communication device and a base station of the cellular network according to an error-correcting repeat request scheme of the uplink transmission.

25. The network node according to claim 21, wherein the at least one processor is configured to:
selectively execute the allocating of the further uplink radio resources in response to determining that the determined fraction of data is larger than zero.

26. The network node according to claim 21, wherein the at least one processor is configured to:
in response to said allocating, send an uplink grant to the communication device, the uplink grant indicating the further uplink radio resources.

27. The network node according to claim 21, wherein the network node is a base station of the cellular network.

28. A non-transitory computer readable storage medium storing a computer program for controlling sending of a buffer status report from a communication device to a cellular network, the computer program comprising program code that when executed by at least one processor of a communication device that is configured to be connected to the cellular network, causes the communication device to:

depending on a total amount of data available in an uplink data buffer of the communication device for uplink transmission and further depending on uplink radio resources previously allocated to the communication device for the uplink transmission in reoccurring time intervals, determine a fraction of the total amount of data available in the uplink data buffer; and send the buffer status report to the cellular network, the buffer status report indicating the determined fraction of data, wherein the determined fraction of data amounts to less than the total amount of data available in the uplink data buffer.

29. A non-transitory computer readable storage medium storing a computer program for controlling allocation of further uplink radio resources for an uplink transmission from a communication device to a cellular network, the computer program comprising program code that when executed by at least one processor of a network node for the cellular network, causes the network node to:

receive a buffer status report from the communication device, the buffer status report indicating a total amount of data available in an uplink data buffer of the communication device for the uplink transmission;

depending on the total amount of data available in the uplink data buffer and further depending on uplink radio resources previously allocated to the communication device for the uplink transmission in reoccurring time intervals, determine a fraction of the total amount of data; and depending on the determined fraction of data, selectively allocate, to the communication device, the further uplink radio resources for the uplink transmission of at least parts of the determined fraction of data, wherein the determined fraction of data amounts to less than the total amount of data available in the uplink data buffer.

\* \* \* \* \*